(12) United States Patent
Ishikawa et al.

(10) Patent No.: US 8,600,655 B2
(45) Date of Patent: Dec. 3, 2013

(54) ROAD MARKING RECOGNITION SYSTEM

(75) Inventors: Tomoaki Ishikawa, Okazaki (JP); Masaki Nakamura, Okazaki (JP); Osamu Aisaka, Okazaki (JP); Motoki Kanba, Okazaki (JP); Motohiro Nakamura, Toyota (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 1147 days.

(21) Appl. No.: 11/922,779

(22) PCT Filed: Aug. 4, 2006

(86) PCT No.: PCT/JP2006/315491
§ 371 (c)(1), (2), (4) Date: Nov. 20, 2008

(87) PCT Pub. No.: WO2007/018145
PCT Pub. Date: Feb. 15, 2007

(65) Prior Publication Data
US 2009/0088978 A1    Apr. 2, 2009

(30) Foreign Application Priority Data

Aug. 5, 2005  (JP) ................................ 2005-228900
Aug. 3, 2006  (JP) ................................ 2006-212481

(51) Int. Cl.
*G06F 17/10*     (2006.01)
*G06K 9/00*      (2006.01)

(52) U.S. Cl.
USPC ............................. 701/300; 382/104; 382/154

(58) Field of Classification Search
USPC ........................................................ 701/300
See application file for complete search history.

(56) References Cited

U.S. PATENT DOCUMENTS

| 7,415,133 B2 * | 8/2008 | Ikeda et al. ................... 382/104 |
| 2004/0160595 A1 * | 8/2004 | Zivkovic et al. ................ 356/73 |
| 2005/0002558 A1 * | 1/2005 | Franke et al. .................. 382/154 |

FOREIGN PATENT DOCUMENTS

| JP | 2003168123 | * | 6/2003 |
| JP | A-2003-168123 |  | 6/2003 |
| JP | A-2003-252148 |  | 9/2003 |
| JP | 2004086363 | * | 3/2004 |
| JP | A-2004-086363 |  | 3/2004 |
| JP | 2004206275 | * | 7/2004 |
| JP | A-2004-206275 |  | 7/2004 |
| JP | 2005063398 | * | 3/2005 |
| JP | A-2005-063398 |  | 3/2005 |
| JP | A-2005-136946 |  | 5/2005 |

OTHER PUBLICATIONS

Japanese Patent Office, Notification of Reason for Refusal mailed Dec. 7, 2010 in Japanese Patent Application No. 2006-212481 w/Partial English-language Translation.

* cited by examiner

*Primary Examiner* — Hiep V Nguyen
(74) *Attorney, Agent, or Firm* — Oliff & Berridge, PLC

(57) ABSTRACT

Systems, methods, and programs capture an image of a periphery of a vehicle. The systems, methods, and programs, store predetermined patterns representing conditions of road markings formed on a road surface, detect a road marking on the basis of the captured image, and compare the detected road marking to the predetermined patterns. If the detected road marking matches one of the predetermined patterns, the systems, methods, and programs execute a predetermined action associated with the matching predetermined pattern.

19 Claims, 16 Drawing Sheets

FIG. 3

ROAD MARKING DB    42

| COORDINATES (POSITION) | TYPE | WEAR PATTERN | CONTROL SUBJECT | DISTANCE TO CONTROL SUBJECT |
|---|---|---|---|---|
| (x1, y1) | PEDESTRIAN CROSSING AHEAD | PATTERN 2 | STOP LINE | 60m |
| (x2, y2) | ARROW | PATTERN 8 | INTERSECTION | 54m |
| (x3, y3) | MAXIMUM SPEED | PATTERN 1 | CORNER | 72m |
| (x4, y4) | PEDESTRIAN CROSSING | PATTERN 3 | INTERSECTION | 89m |
| ⋮ | | | | |

FIG. 4

| PATTERN NO. | PATTERN 1 | PATTERN 2 | PATTERN 3 | PATTERN 4 |
|---|---|---|---|---|
| PATTERN NAME | COMPLETE SHAPE | LITTLE WEAR OVERALL | NEAR SIDE WEAR | FAR SIDE WEAR |
| CHARACTERISTIC | ENTIRE SHAPE CLEARLY REMAINS | PAINT WORN OR THIN, BUT OUTER SHAPE REMAINS *BOTH TIP END OF NEAR SIDE AND TIP END OF FAR SIDE REMAIN, LEFT/RIGHT TIP ENDS ALSO REMAIN | NEAR SIDE FADED DUE TO WEAR *LEFT/RIGHT TIP ENDS REMAIN | FAR SIDE FADED DUE TO WEAR *LEFT/RIGHT TIP ENDS REMAIN |
| SUITABILITY AS A DETECTION SUBJECT | ◎ | ○ | △ | △ |
| IMAGE AND MEASUREMENT STARTING POINTS | 60A, 60C, 60D, 60B, 60 | 60A, 60B, 60, 61 | 60A, 60C, 60, 61 | 60D, 60B, 60, 61 |

← VEHICLE ADVANCEMENT DIRECTION

FIG. 5

| PATTERN NO. | PATTERN 5 | PATTERN 6 | PATTERN 7 | PATTERN 8 |
|---|---|---|---|---|
| PATTERN NAME | LEFT SIDE WEAR | RIGHT SIDE WEAR | OBSTRUCTION | MUCH WEAR OVERALL |
| CHARACTERISTIC | LEFT SIDE FADED DUE TO WEAR *NEAR AND FAR TIP ENDS REMAIN | RIGHT SIDE FADED DUE TO WEAR *NEAR AND FAR TIP ENDS REMAIN | MANHOLE OR ROAD SEAM FORMED ON INTERIOR AND PERIPHERY, OBSTRUCTING PART OF PAINT | PAINT WORN OR THIN SUCH THAT OUTER SHAPE IS UNDEFINED *BOTH TIP END OF FAR SIDE AND TIP END OF NEAR SIDE FADED |
| SUITABILITY AS A DETECTION SUBJECT | △ | △ | △ | ✕ |
| IMAGE AND MEASUREMENT STARTING POINTS | (60, 60A, 60B, 61) | (60, 60A, 60B, 61) | (60, 60A, 60B, 62) | (60, 61) |

FIG. 13

| PATTERN No. | PATTERN 1 | PATTERN 2 | PATTERN 3 | PATTERN 4 | PATTERN 5 |
|---|---|---|---|---|---|
| PATTERN NAME | FULL SHAPE | SLIGHT WEAR | PARTIAL BAD WEAR | GENERAL BAD WEAR | DIVIDED INTO DOUBLE LINES |
| CONDITION | RECTANGULAR FRAME COMPLETELY INTACT, INTERIOR PAINT EVEN | RECTANGULAR FRAME COMPLETELY INTACT, BUT INTERIOR PAINT UNEVEN | PAINT PARTIALLY MISSING, RECTANGULAR FRAME PARTIALLY MISSING | AT LEAST HALF OF PAINT MISSING, DOES NOT RESEMBLE THICK BROKEN LINE | CRACK FORMED IN LENGTH DIRECTION OF THICK BROKEN LINE, RESEMBLES DOUBLE LINE |
| SUITABILITY AS DETECTION SUBJECT | ◎ | ○ | × | × | △ |
| IMAGE |  |  |  |  |  |
| CONCERNS | NONE | NONE | FORCIBLE RECOGNITION MAY LEAD TO ERRONEOUS RECOGNITION OF OTHER LOCATION | CANNOT BE RECOGNIZED | LIKELY TO BE RECOGNIZED AS DOUBLE LINES RATHER THAN THICK BROKEN LINE |
| TREATMENT | RECOGNITION RESULT EMPLOYED AS IS | RECOGNITION RESULT EMPLOYED AS IS | RECOGNITION PROCESSING NOT PERFORMED | RECOGNITION PROCESSING NOT PERFORMED | WHEN RECOGNIZED AS DOUBLE LINES AND NO OTHER DOUBLE LINES EXIST ON VEHICLE PERIPHERY, ASSUME TO BE THICK BROKEN LINE AND EMPLOY RESULT CORRESPONDINGLY |

ROAD MARKING RECOGNITION SYSTEM

INCORPORATION BY REFERENCE

This application is a National Phase of International Patent Application No. PCT/JP06/315491, filed Aug. 4, 2006, which claims priority of Japanese Patent Application Nos. 2005-228900, filed Aug. 5, 2005, and 2006-212481, filed Aug. 3, 2006. The disclosures of these applications are incorporated herein by reference in their entirety.

BACKGROUND

1. Related Technical Fields

Related technical fields include road marking recognition systems that recognize road markings formed on a road surface on the basis of an image captured by imaging means.

2. Related Art

Driving support devices that prevent traffic accidents by obtaining information relating to vehicle travel (such as road information obtained from map data of a navigation device and a current position identified by GPS or the like) notifying a driver thereof, providing driving assistance, and even intervening in the driving, have been proposed.

These driving support devices notify the driver and control the vehicle at an accurate time by having imaging means such as a camera provided on all surfaces of the vehicle so that the notification and the vehicle control are performed on the basis of captured images. For example, Japanese Patent Application Publication 2004-86363 (page 8 to page 10 and FIG. 4) describes a driving assistance device for a vehicle which detects a temporary stop line formed on a road from image data captured by a CCD camera that is disposed facing the front of the vehicle, and executes driving assistance at an intersection on the basis of the detection result.

SUMMARY

With the driving assistance device described in Japanese Patent Application Publication 2004-86363, a temporary stop line serving as a control subject is detected directly and uniformly by detection means such as a CCD camera. However, because the temporary stop line is formed on the surface of the road traveled by vehicles, a part of the paint may peel away or become thin over time due to various causes such as friction from the tires. Thus, over time the temporary stop line may be detected erroneously or may be difficult to detect.

Moreover, when all road markings, including road markings that are likely to be recognized erroneously, are detected, the processing load of the device increases and a control unit for performing image processing must be provided separately. As a result, the entire device becomes more expensive, hindering widespread use of such vehicle control devices using cameras.

Various exemplary implementations of the broad principles described herein provide a road marking recognition system in which a recognition error ratio is reduced by eliminating road markings that are difficult to detect as detection subjects in advance. Thus, the processing load and const of the device may be reduced by performing only required processing.

Various exemplary implementations provide systems, methods, and programs that capture an image of a periphery of a vehicle. The systems, methods, and programs store predetermined patterns representing conditions of road markings formed on a road surface, detect a road marking on the basis of the captured image, and compare the detected road marking to the predetermined patterns. If the detected road marking matches one of the predetermined patterns, the systems, methods, and programs execute a predetermined action associated with the matching predetermined pattern.

BRIEF DESCRIPTION OF THE DRAWINGS

Exemplary implementations will now be described with reference to the accompanying drawings, wherein:

FIG. 3 is a view showing a storage area of an exemplary road marking DB;

FIGS. 4 and 5 are an illustrative views showing exemplary wear patterns used in the driving support device;

FIG. 13 is an illustrative view showing exemplary wear patterns of a "thick broken line" road marking used in a driving support device;

DETAILED DESCRIPTION OF EXEMPLARY IMPLEMENTATIONS

Figure 1:
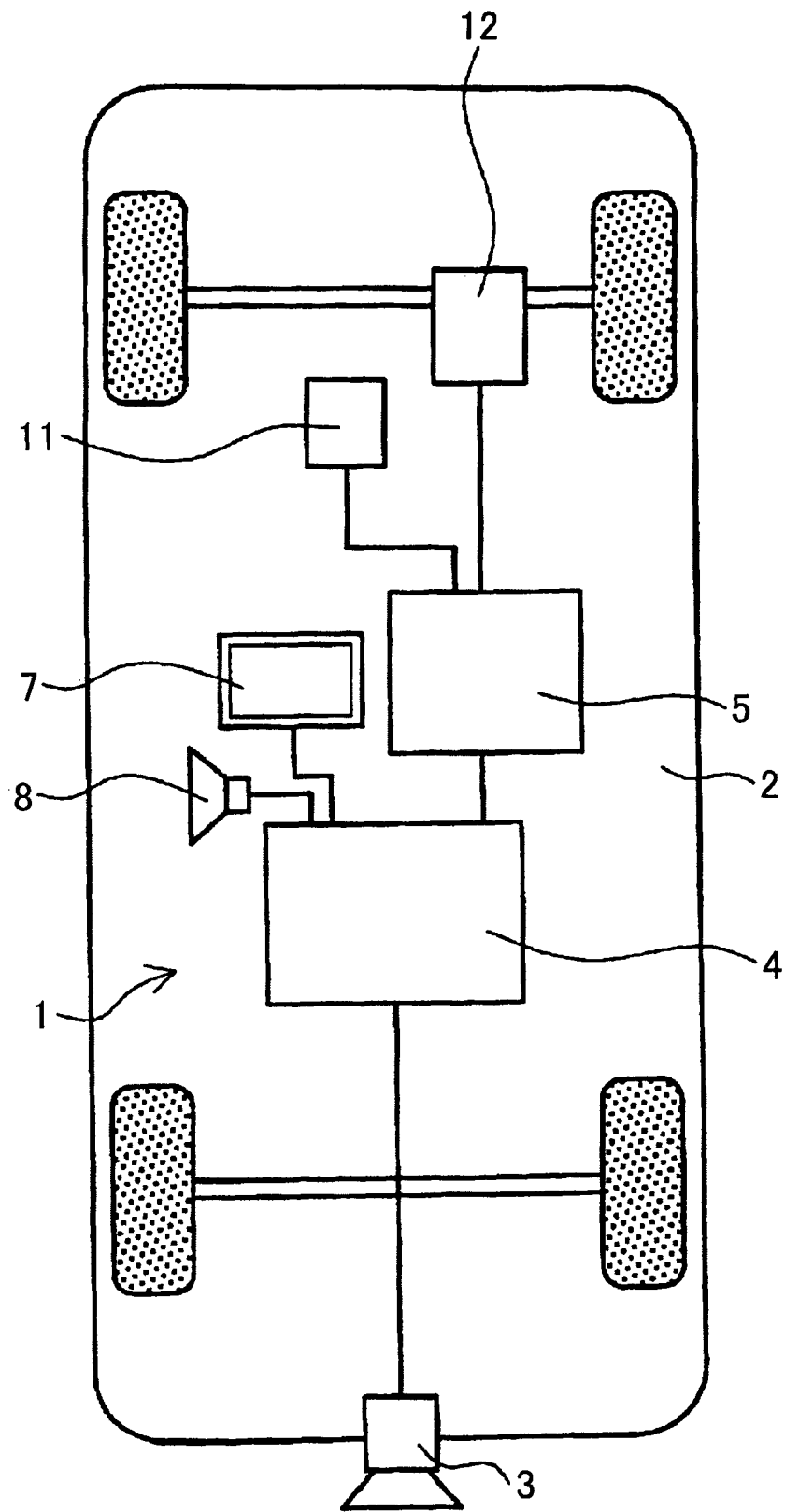
FIG. 1 is a schematic diagram of an exemplary driving support device.

An exemplary driving support device using a road marking recognition system will be described in detail. FIG. 1 is a schematic diagram of an exemplary driving support device 1.

As shown in FIG. 1, the exemplary driving support device 1 may include a rear camera (imaging device) 3, a navigation device 4, a vehicle ECU 5, and so on, all of which are disposed in relation to a vehicle 2.

The rear camera 3 employs a solid state imaging element such as a CCD, for example, and is attached near the upper center of a number plate attached to the rear of the vehicle 2 such that a sight line direction faces 45 degrees downward from the horizon. During parking, the rear camera 3 captures an image of the rear of the vehicle, which is the direction of advancement of the vehicle 2, and the captured image (to be referred to hereafter as a BGM (Back Guide Monitor) image) is displayed on a liquid crystal display 7 of the navigation device. Meanwhile, during normal traveling, images are captured of road markings such as stop lines, pedestrian crossings, and maximum vehicle speeds formed on the road surface around the vehicle 2, as will be described below. The distance from the vehicle 2 to a control subject serving as the subject of travel guidance or vehicle control, such as a stop line, an intersection, or a curb entrance is calculated indirectly on the basis of the captured road marking image.

Further, the navigation device 4 is constituted by a controller, such as a navigation ECU (Electronic Control Unit) 6, the liquid crystal display 7, which is attached to a center console or panel surface in the cabin of the vehicle 2 for displaying a map or a proposed route to a target location, a speaker 8 for outputting audio guidance relating to the route guidance, a current location detection unit 9 for identifying the current location and advancement direction of the vehicle 2 on a map, a data recording unit 10 storing map data for displaying a map and information relating to the types and positions of road markings formed on the road surface, and a communication device 13 for communicating with an information center or the like.

The navigation ECU 6 is an electronic control unit which performs normal route search and route guidance processing, detection processing for detecting a road marking formed on the surface of the road on which the vehicle 2 is traveling from images captured by the rear camera 3, calculation processing for calculating a distance from the vehicle 2 to a control subject such as a stop line, intersection, or curb entrance indirectly from the detected road marking, drive control instruction processing and route guidance processing in relation to the vehicle 2 on the basis of the calculated distance, and so on. Note that the structure of the navigation ECU 6 will be described in detail below.

The vehicle ECU 5 is an electronic control unit of the vehicle 2 for controlling operations of an engine, a transmission, an accelerator, a brake, and so on, to which a brake actuator 11 and an accelerator actuator 12 are connected. The navigation ECU 6 transmits a control signal to the brake actuator 11 and accelerator actuator 12 via the vehicle ECU 5 when a predetermined condition is satisfied, whereby a control force is applied automatically to vary the brake pressure or the amount of air taken into the engine.

Figure 2:
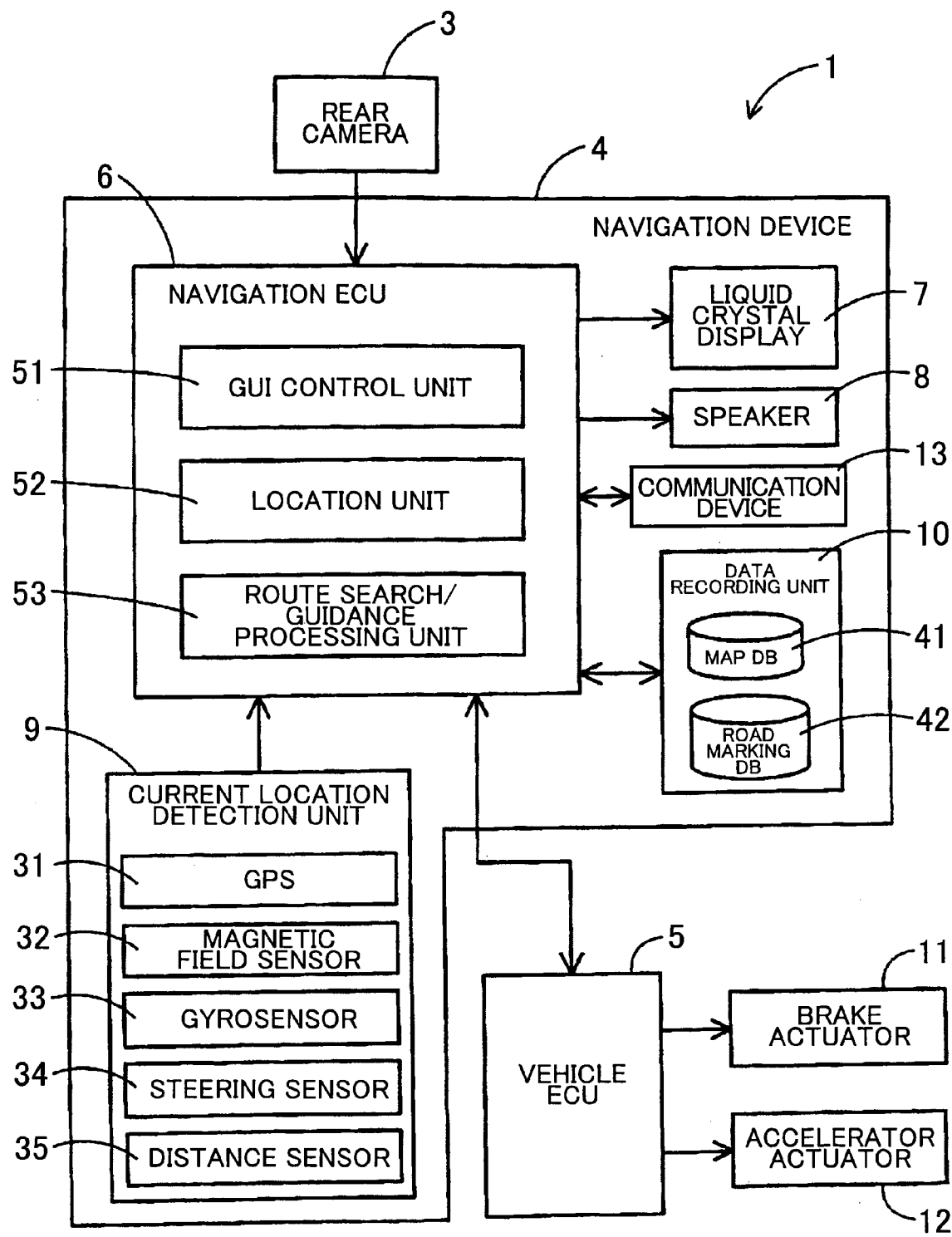
FIG. 2 is a block diagram showing an exemplary control system of the driving support device.

Next, a structure relating to an exemplary control system of the driving support device 1 will be described on the basis of FIG. 2, focusing in particular on the navigation device 4. FIG. 2 is a block pattern diagram showing the exemplary control system of the driving support device. In FIG. 2, the control system of the driving support device 1 is basically constituted by the navigation device 4 and the vehicle ECU 5, with predetermined peripheral devices being connected to each.

Each structural element of the navigation device 4 will be described below. The current location detection unit 9 includes a GPS 31, a magnetic field sensor 32, a gyrosensor 33, a steering sensor 34, a distance sensor 35, an altimeter (not shown in the drawing), and so on, and is capable of detecting the current position of the vehicle, the current bearing of the vehicle, the traveling distance from a predetermined point, and so on.

Specifically, the GPS 31 detects the current location and current time of the vehicle on Earth by receiving radio waves emitted by an artificial satellite, and the magnetic field sensor 32 detects the bearing of the vehicle by measuring geomagnetism.

The gyrosensor 33 detects the traverse angle of the vehicle. Here, a gas rate gyro, a vibration gyro, or another gyro may be employed as the gyrosensor 33, for example. Further, the bearing of the vehicle can be detected by integrating the traverse angle detected by the gyrosensor 33.

The steering sensor 34 detects the steering angle of the vehicle. Here, an optical rotation sensor attached to the rotary portion of a steering wheel (not shown), a rotational resistance sensor, an angle sensor attached to a vehicle wheel, or another sensor may be employed as the steering sensor 34, for example.

Further, the distance sensor 35 detects a movement speed (cumulative movement distance) on the basis of a vehicle speed pulse generated by the engine every time a fixed distance is traveled.

The data recording unit 10 includes a hard disk (not shown) serving as an external storage device and a storage medium, and a recording head (not shown) which is a driver for reading a predetermined program recorded on the hard disk, a map DB 41 storing information such as map data required for route guidance and map display, a road marking DB (marking condition storage means, marking position storage means) 42 storing information relating to road markings, and so on, and writing predetermined data to the hard disk. Note that in this example a hard disk is used as the external storage device and storage medium of the data recording unit 10; but, instead of a hard disk, a magnetic disk such as a flexible disk may be used as the external storage device. Further, a memory card, magnetic tape, a magnetic drum, a CD, MD, DVD, optical disk, MO, IC card, optical card, and so on may be used as the external storage device.

Various information required for route guidance and map display is recorded in the map DB 41, for example map data for displaying a map, intersection data relating to intersections, node data relating to node points, road data relating to roads, search data for route searching, facility data relating to facilities, search data for location searching, and so on. Moreover, in the navigation device 4 according to this example, types of road markings formed on the road surface (for example, a stop line, a pedestrian crossing, or a maximum speed), wear patterns indicating the wear condition of the paint forming the road marking, identification information for identifying the type of a detected road marking, and coordinate data identifying the position of the road marking on a map, are recorded in the road marking DB 42. Note that the road marking DB 42 will be described in detail below using FIG. 3.

The navigation ECU 6 includes a CPU which serves as a calculation device and control device for performing overall control of the navigation device 4, and internal storage devices such as a RAM, which is used as working memory when the CPU performs various types of calculation processing and which stores route data and the like during a route search, and a ROM, which stores a control program, a route guidance processing program for performing a route search to a target location and route guidance along the proposed route, and a driving support processing program to be described below (see FIG. 10), which calculates the distance to a control subject (a stop line, intersection, curb entrance, or the like) on the basis of the images captured by the rear camera 3 and performs driving assistance. Note that semiconductor memory, a magnetic core, or similar is used as the RAM, ROM, and so on. Further, an MPU or the like may be used as the calculation device and control device in place of the CPU.

The navigation ECU 6 further includes a GUI control unit 51, a location unit 52, and a route search/guidance processing unit 53, and performs various types of control based on information obtained from the rear camera 3, current location detection unit 9, the data recording unit 10, and the various peripheral devices.

Here, the GUI control unit 51 causes the liquid crystal display 7 to display an appropriate map image of the periphery of the vehicle on the basis of map data read from the map DB 41 and the current position of the vehicle detected by the location unit 52. When route guidance is required, the GUI control unit 51 synthesizes icons, guidance screens, proposed routes, and so on with the map image and causes the liquid crystal display 7 to display the synthesized image.

The location unit 52 detects the current absolute position (latitude/longitude) of the vehicle 2 on the basis of various information supplied by the current location detection unit 9. The location unit 52 also determines, from the detected current position and the information stored in the road marking DB 42, whether or not a road marking in a favorable condition which satisfies a predetermined reference in terms of the state of paint wear exists within a predetermined range (30 m frontward to 20 m rearward) of the vehicle 2, and if so, downloads the image captured by the rear camera 3 and performs analysis processing to detect and recognize the road marking on the road surface. The location unit 52 also calculates the distance between the road marking detected from the captured image and the vehicle 2, calculates the distance to a control subject that is associated with the road marking from the previously calculated distance, and performs drive control on the vehicle 2 by controlling the brake actuator 11 and accelerator actuator 12 in accordance with the calculated distance, or performs driving guidance using the liquid crystal display 7 and speaker 8.

When a target location has been set, the route search/guidance processing unit 53 performs a route search from the current location to the target location on the basis of the node point data and search data stored in the data recording unit 10, and uses the liquid crystal display 7 and speaker 8 to perform route guidance in accordance with the set designated route.

Various peripheral devices such as the liquid crystal display 7, speaker 8, and communication device 13 are electrically connected to the navigation ECU 6.

The liquid crystal display 7 displays operation guidance, an operation menu, key guidance, a designated route from the current location to the target location, guidance information along the designated route, traffic information, news, weather forecasts, the time, mail, television programs, the BGM images captured by the rear camera 3, and so on. Note that a CRT display, plasma display, or another display may be used in place of the liquid crystal display 7. Alternatively, a hologram device or the like which projects holograms onto the windshield of the vehicle may be used.

The speaker 8 outputs audio guidance for guiding travel along the designated route on the basis of an instruction from the navigation ECU 6. Here, the audio guidance includes "turn right at the intersection in 200 m," "national highway no. XX is congested," and so on, for example. A synthesized voice, various sound effects, and various types of guidance information recorded on tape or memory in advance may be output as the sound from the speaker 8. Further, in the navigation device 4 according to this example, when the distance from the vehicle to the control subject has reached a predetermined distance, travel guidance relating to the control subject (for example, a warning that a stop line is approaching or the like) is performed by the liquid crystal display 7 and speaker 8.

The communication device 13 is a beacon receiver for receiving various types of traffic information, such as congestion information, restriction information, parking lot information, traffic accident information, and service area congestion information, from an information center, for example a VICS® (Vehicle Information and Communication System) center or the like, via a radio wave beacon device, optical beacon device, or the like disposed on the roadside, in the form of a radio wave beacon, optical beacon, or the like. A network device which enables communication in a communication system such as a communication network, for example a LAN, WAN, Intranet, portable telephone network, telephone network, public communication network, private communication network, or the Internet, may be used as the communication device 13. Further, the communication device 13 includes an FM receiver for receiving, in addition to the information from the aforementioned information center, FM multiplex information such as news, weather forecasts, and so on via an FM broadcasting station in the form of an FM multiplex broadcast. Note that the beacon receiver and FM receiver are integrated and provided as a VICS receiver, but may be provided separately. The navigation device 4 according to this example also connects to the information center via the communication device 13 and updates the information stored in the map DB 41 and road marking DB 42.

Next, the road marking DB 42 of the data recording unit 10, which stores information relating to road markings, will be described on the basis of FIG. 3. FIG. 3 is a view showing the storage area of the road marking DB 42 according to this example.

As shown in FIG. 3, the storage area of the road marking DB 42 is constituted by the coordinates (position) of the road marking on the map data, the road marking type, a wear pattern indicating the wear condition of the paint of the road marking, a control subject associated with the road marking, and the distance from a measurement starting point of the road marking to the control subject (the measurement starting point closest to the control subject when a plurality of measurement starting points exists).

Here, the wear patterns of a road marking stored in the road marking DB will be described with reference to FIGS. 4 and 5. FIGS. 4 and 5 are illustrative views showing wear patterns used in the driving support device 1 according to this example, in particular the wear patterns of a "pedestrian crossing ahead" road marking 60.

As shown in FIGS. 4 and 5, a total of eight wear patterns are defined for the "pedestrian crossing ahead" road marking 60 in the driving support device 1 according to this example, and these patterns are classified on the basis of the position and range of the wear.

For example, road markings having no substantial paint wear and a clearly defined overall shape are classified into a pattern 1. Road markings having a worn part 61 where the paint has worn away or worn thin, but in which the outer form remains, are classified into a pattern 2. Road markings having the worn part 61 where the paint has worn away or worn thin on the near side in the advancement direction of the vehicle are classified into a pattern 3. Road markings having the worn part 61 where the paint has worn away or worn thin on the far side in the advancement direction of the vehicle are classified into a pattern 4. Road markings having the worn part 61 where the paint has worn away or worn thin on the left side in the advancement direction of the vehicle are classified into a pattern 5. Road markings having the worn part 61 where the paint has worn away or worn thin on the right side in the advancement direction of the vehicle are classified into a pattern 6. Road markings in which a part of the paint is missing due to an obstruction 62 caused by a manhole lid, a road seam, or the like, are classified into a pattern 7. Road markings having an undefined outer form due to missing or thin paint are classified into a pattern 8.

Each wear pattern is set with measurement starting points 60A to 60D in different positions of the road marking 60. Here, the measurement starting points 60A to 60D are provided at the corner portions and tip end portions of the lines (boundary lines) forming the road marking 60, and, as will be described below, when calculating the distance from the vehicle 2 to the road marking, the distance from the vehicle 2 to the measurement starting point furthest advanced in the advancement direction (the measurement starting point 60A in the case of the "pedestrian crossing ahead" road marking 60 in FIGS. 4 and 5) is calculated. This distance is then used as the distance from the vehicle 2 to the road marking.

Here, the measurement starting points 60A to 60D in four locations are defined in relation to the "pedestrian crossing ahead" road marking 60, but to improve the precision of distance measurement in the respective wear patterns, presetting is performed such that only the measurement starting points in sites with little wear, from among the measurement starting points 60A to 60D, are used as measurement starting points. For example, in the pattern 1, all of the measurement starting points 60A to 60D are set as measurement starting points that can be used. In the pattern 2, only the measurement starting points 60A, 60B that can be detected from the boundary lines are set as the measurement starting points that can be used. In the pattern 3, only the measurement starting points 60A, 60C that can be detected from the boundary lines are set as the measurement starting points that can be used. In the pattern 4, only the measurement starting points 60B, 60D that can be detected from the boundary lines are set as the measurement starting points that can be used. In the pattern 5, only the measurement starting points 60A, 60B that can be detected from the boundary lines are set as the measurement starting points that can be used. In the pattern 6, only the measurement starting points 60A, 60B that can be detected from the boundary lines are set as the measurement starting points that can be used. In the pattern 7, only the measurement starting points 60A, 60B that can be detected from the boundary lines are set as the measurement starting points that can be used. In the pattern 8, no usable measurement starting points are set.

Figure 10:
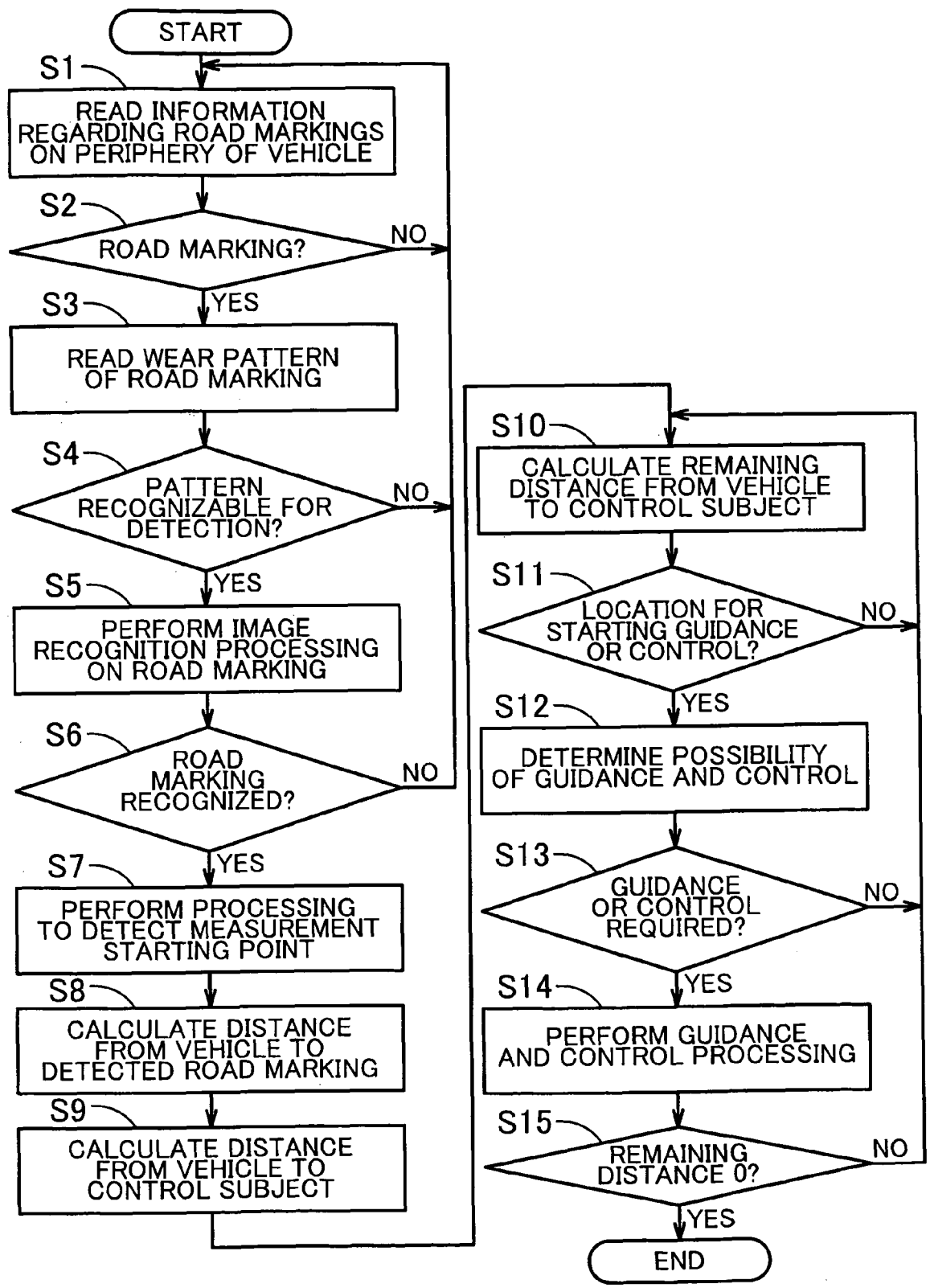
FIG. 10 is a flowchart of an exemplary driving support method.

As will be described below, the navigation ECU 6 reads the wear pattern of the detection subject road marking from the road marking DB 42, selects a measurement starting point from the measurement starting points set as usable starting points for distance measurement, and calculates the distance from the vehicle 2 to the measurement starting point which is furthest advanced in the advancement direction side (the measurement starting point 60A in the case of the "pedestrian crossing ahead" road marking 60 in FIGS. 4 and 5) (see e.g., S7, S8 in FIG. 10). Thus, a part of the road marking having little wear can be used as the distance measurement starting point, enabling an improvement in the precision of the distance measurement. A more specific description of an example of the distance calculation method will be provided below.

Further, in the driving support device 1 according to this example, control is executed such that road marking detection processing is not performed on a road marking in which "the outer form is undefined due to missing or thin paint," which is classified into the pattern 8. In so doing, road markings which are difficult to detect are eliminated as detection subjects in advance, enabling a reduction in the recognition error ratio during road marking recognition, and a reduction in the processing load of the navigation ECU 6 since only necessary processing need be performed.

Note that in FIGS. 4 and 5, the wear patterns of a "pedestrian crossing ahead" road marking alone are described as an example, but the wear patterns 1 to 8 are set similarly for other road markings (for example, "stop line," "arrow," "pedestrian crossing," and so on), and the road markings recorded in the road marking DB 42 are classified into one of the wear patterns. Likewise, measurement starting points are defined for each pattern, and control is executed to ensure that road marking detection processing is not performed on road markings classified into the patterns 8 for the other road markings.

Here, returning to FIG. 3 to further describe the storage area of the road marking DB 42, a "pedestrian crossing ahead" road marking of the wear pattern 2 is formed at coordinates (x1, y1) in FIG. 3, for example, and a "stop line" road marking is associated with the road marking as a control subject 60 m ahead. Further, an "arrow" road marking of the wear pattern 8 is formed at coordinates (x2, y2), and an "intersection (intersection node)" is associated with the road marking as a control subject 54 m ahead. Further, a "maximum speed" road marking of the wear pattern 1 is formed at coordinates (x3, y3), and a "corner (corner starting point node)" is associated with the road marking as a control subject 72 m ahead. Further, a "pedestrian crossing" road marking of the wear pattern 3 is formed at coordinates (x4, y4), and an "intersection (intersection node)" is associated with the road marking as a control subject 89 m ahead.

Here, the control subject serves as the subject of travel guidance or vehicle control, and a node point or other road marking within a predetermined section (between 10 m and 200 m, for example) of the advancement direction of the road formed with the road marking is used as the control subject. When the rear camera 3 captures an image of one of the road markings recorded in the road marking DB 42, the navigation ECU 6 calculates the distance to the associated control subject indirectly from the captured image, and when the distance reaches a predetermined distance, the navigation ECU 6 performs drive control or travel guidance on the vehicle 2.

Further, the content of the drive control or travel guidance performed on the vehicle 2 differs according to the type of the associated control subject. For example, when a "stop line" serves as the control subject and the distance to the stop line reaches 50 m, the character string "stop line approaching," indicating the approach of the stop line, is displayed on the liquid crystal display 7, or an audio warning announcing "stop line approaching" is output from the speaker 8. Moreover, if deceleration is not performed at this point, deceleration control is performed by controlling the brake actuator 11 to stop the vehicle 2 in front of the stop line.

Further, when an "intersection" serves as the control subject and the distance to a node of the corresponding intersection reaches 10 m, route guidance is performed in accordance with the set designated route. For example, a guidance display indicating a left turn is displayed on the liquid crystal display 7 and audio guidance saying "turn left at the next intersection" is output through the speaker 8. Note that when no designated route has been set, no particular guidance display or audio guidance is output.

Further, when a "corner" serves as the control subject and the distance to a node of the starting point of the corresponding corner reaches 50 m, acceleration and deceleration control are performed by controlling the brake actuator 11 and accelerator actuator 12 to achieve an optimum speed in relation to the R of the corner (for example, 40 km/h at R30), which is recorded in the map DB 41, before entering the corner. Acceleration and deceleration control are performed similarly during cornering by controlling the brake actuator 11 and accelerator actuator 12 to achieve an optimum speed.

Next, using FIGS. 6 through 9, an exemplary method of calculating the distance from the vehicle 2 to a road marking and the distance from the vehicle 2 to the control subject associated with the road marking when an image of the road marking has been captured by the rear camera 3 of the vehicle 2 will be described citing a specific example. The exemplary method may be implemented, for example, by one or more components of the above-described device. However, even though the exemplary structure of the above-described device may be referenced in the description, it should be appreciated that the structure is exemplary and the exemplary method need not be limited by any of the above-described exemplary structure.

Figure 6:
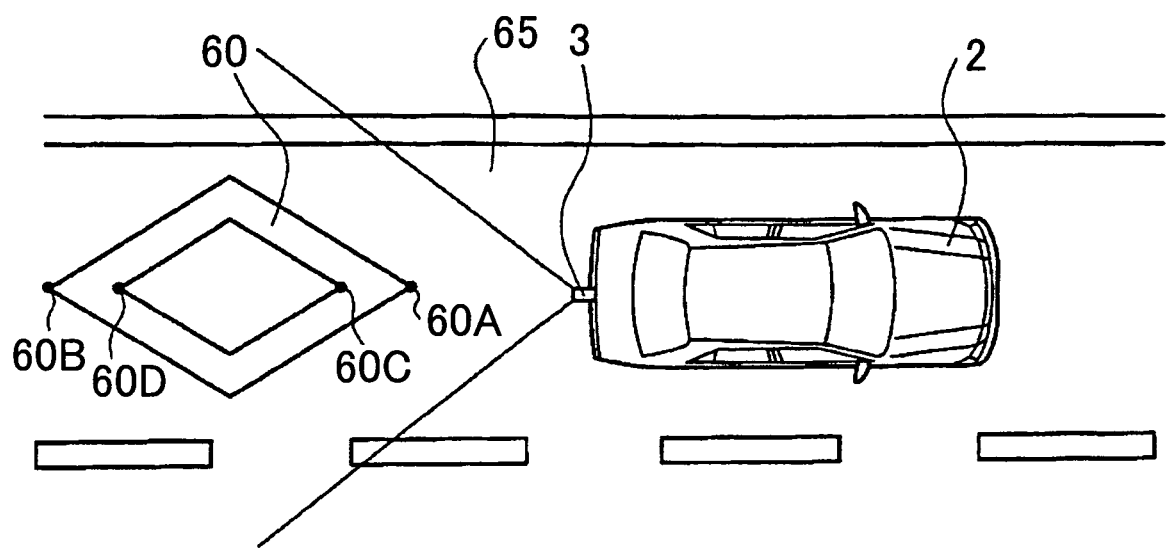
FIG. 6 is an exemplary overhead view showing a vehicle during image capture of a road marking.
Figure 7:
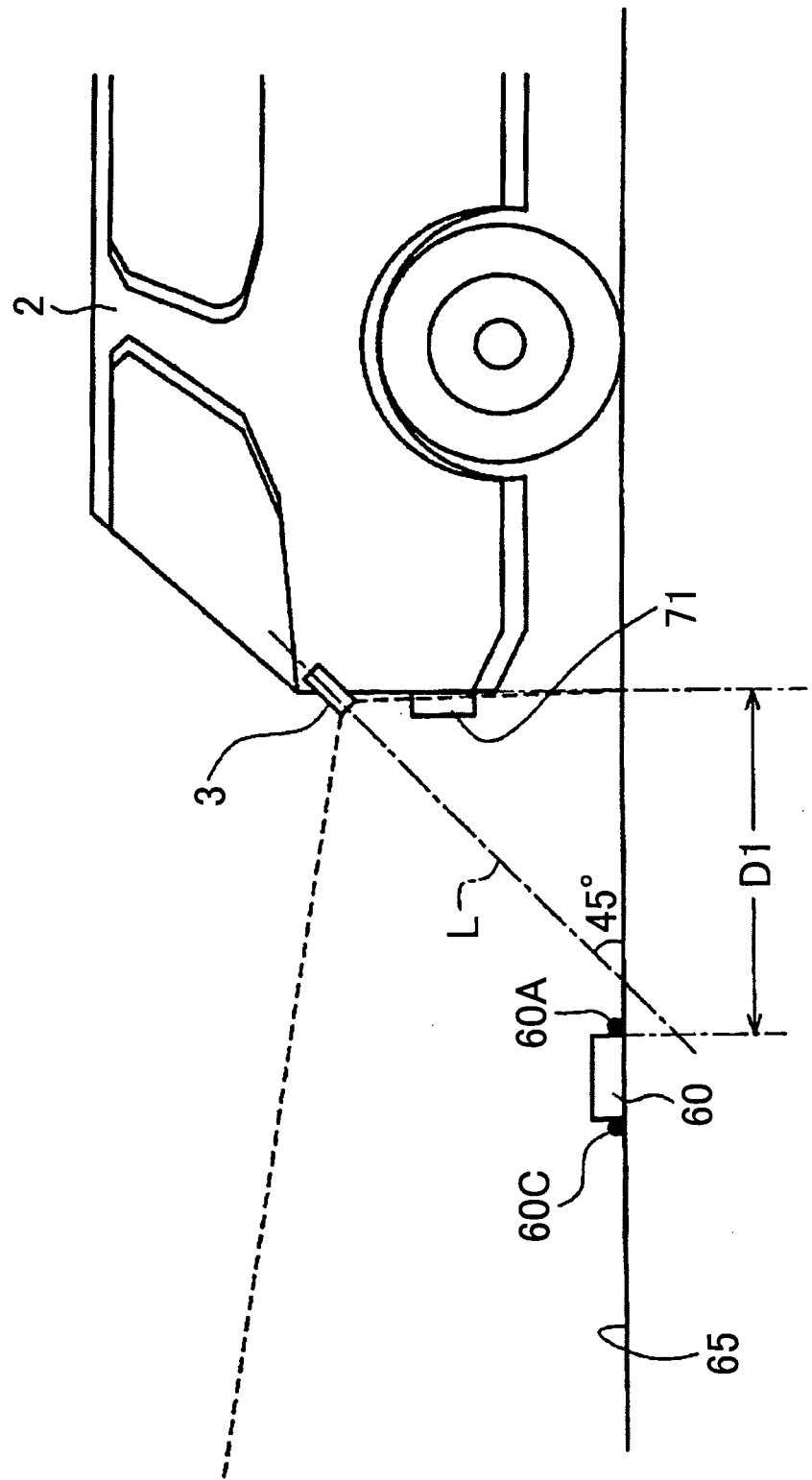
FIG. 7 is an exemplary side view showing a vehicle during image capture of a road marking.
Figure 8:
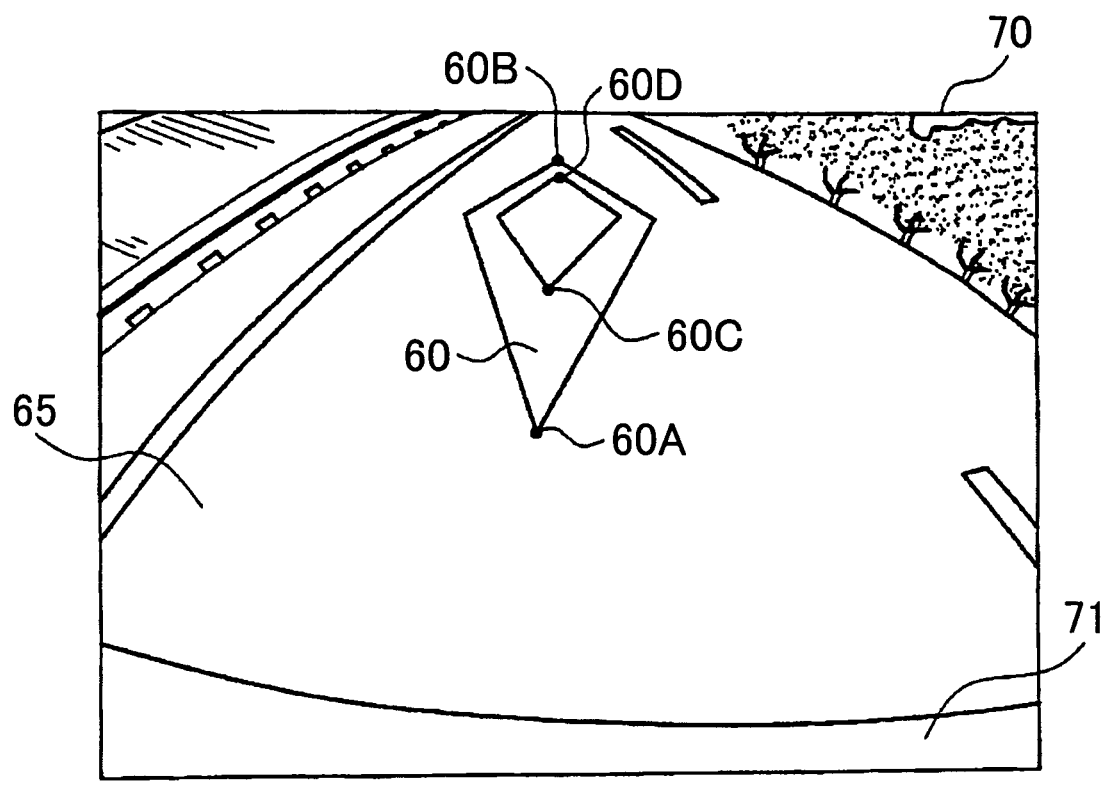
FIG. 8 is a pattern diagram showing an exemplary image captured by a rear camera of the vehicle in the state shown in FIGS. 6 and 7.

In the following specific example, it is assumed that, from among the road markings formed on a road surface 65 along which the vehicle 2 is traveling, an image of the "pedestrian crossing ahead" road marking 60 having the wear pattern 1, with which a stop line road marking 69 is associated as the control subject, has been captured. FIG. 6 is a top view showing the vehicle 2 during image capture of the road marking 60. FIG. 7 is a side view showing the vehicle 2 during image capture of the road marking 60. FIG. 8 is a pattern diagram showing an image 70 captured by the rear camera 3 of the vehicle 2 in the state shown in FIGS. 6 and 7.

As shown in FIG. 7, the rear camera 3 is attached such that an optical axis L is oriented 45 degrees in a downward direction from the horizon, enabling the rear camera 3 to capture images of the rear of the vehicle 2 from the vicinity of a rear bumper 71, and the imaging range thereof is fixed. Accordingly, the distance to the object can be calculated from the image data position (more specifically, the pixel count from the lower edge) in the image captured by the rear camera 3 and shown in FIG. 8.

Here, measurement starting points are defined in advance in a plurality of locations on the road marking for measuring the distance to the vehicle 2, as described above, and moreover, a measurement starting point to be used as the measurement starting point is set in accordance with the wear pattern (see FIGS. 4, 5).

In the captured image of the road marking shown in FIG. 8, a distance D1 from the vehicle 2 to the measurement starting point can be calculated from the position of the measurement starting point (more specifically, the pixel count from the lower edge to the measurement starting point). Here, the measurement starting point of the plurality of measurement starting points that is to be used in the distance calculation is determined for each road marking, and in the "pedestrian crossing ahead" road marking 60 having the wear pattern 1 shown in FIG. 4, for example, the distance to the measurement starting point 60A is calculated. However, when the measurement starting point 60A cannot be identified for some reason (when a part of the white line is hidden by an obstruction such as sand or water, for example), first the distance to the measurement starting point 60B is calculated, whereupon the distance to the measurement starting point 60A is calculated indirectly using the distance between the measurement starting point 60A and the measurement starting point 60B. When the measurement starting point 60B cannot be identified, the measurement starting point 60C is used, and when the measurement starting point 60C cannot be identified, the measurement starting point 60D is used.

Further, in the "pedestrian crossing ahead" road marking 60 having the wear pattern 4 shown in FIG. 4, the measurement starting points 60B, 60D are set as measurement starting points to be used as distance measurement starting points, and therefore the distance to the measurement starting point 60B is calculated first, whereupon the distance to the measurement starting point 60A is calculated indirectly using the distance between the measurement starting point 60A and the measurement starting point 60B. However, when the measurement starting point 60B cannot be identified for some reason (when a part of the white line is hidden by an obstruction such as sand or water, for example), the measurement starting point 60D is used. Note that the measurement starting point of the plurality of measurement starting points that is to be used in the distance calculation is determined similarly for the other wear patterns and other road markings.

Figure 9:
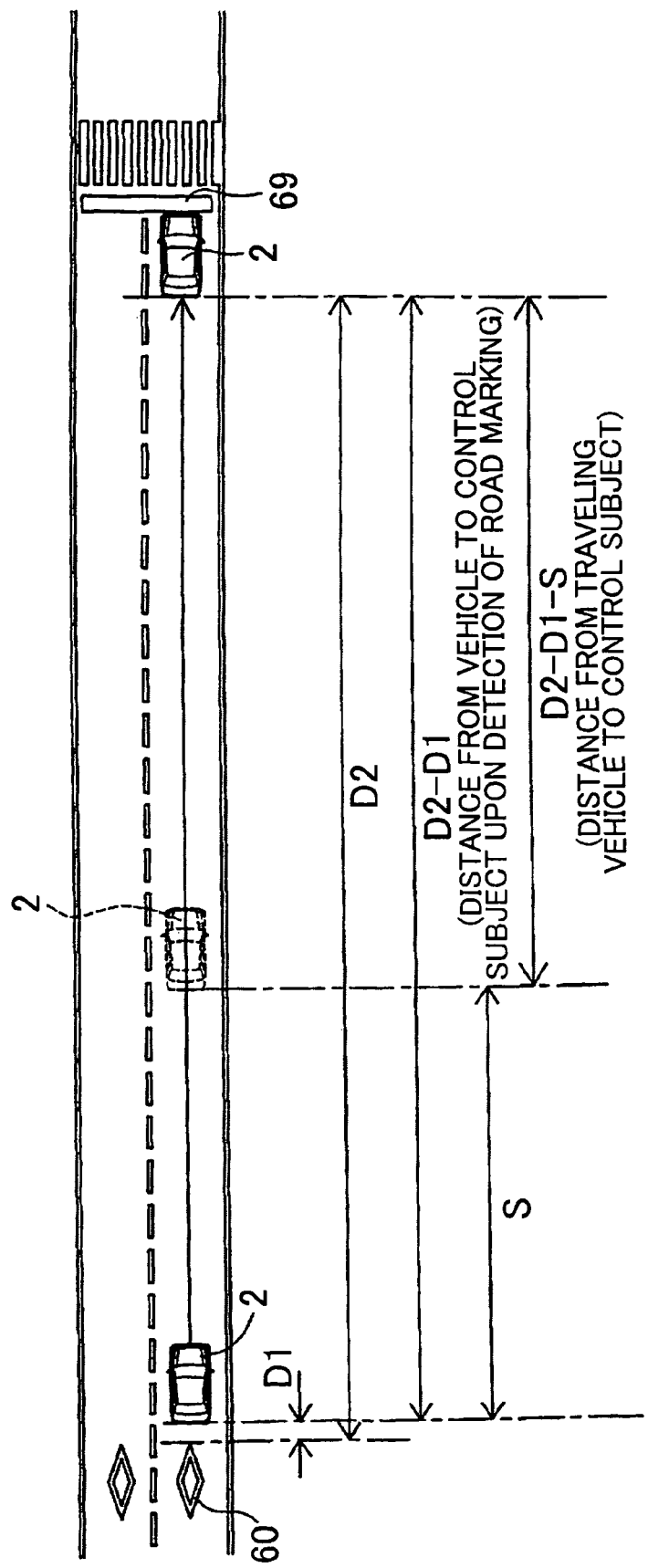
FIG. 9 is a pattern diagram illustrating an exemplary method of calculating a distance from the vehicle to a control subject when a road marking is captured by the rear camera of the vehicle.

When the distance D1 from the vehicle 2 to the measurement starting point of the road marking has been calculated using the method described above, the distance from the vehicle 2 to the control subject (see FIG. 3) associated with the detected road marking can be calculated on the basis thereof. FIG. 9 is a pattern diagram illustrating an exemplary method of calculating the distance from the vehicle 2 to the control subject when an image of the road marking has been captured by the rear camera 3 of the vehicle 2.

FIG. 9 shows a case in which the "pedestrian crossing ahead" road marking 60 has been detected by the rear camera 3 of the vehicle 2. The "stop line" road marking 69 at a distance D2 ahead is associated with the road marking 60 as the control subject.

In this case, by subtracting the distance D1 from the distance D2, a distance (D2−D1) from the vehicle 2 to the control subject at the point of detection of the road marking 60 can be calculated. Further, the navigation ECU 6 calculates a traveling distance S of the vehicle 2 using the distance sensor 35 on the basis of a vehicle speed pulse generated by the engine every time a fixed distance is traveled. By subtracting the traveling distance S from the distance (D2−D1) from the vehicle 2 to the control subject, a distance (D2−D1−S) from the traveling vehicle 2 to the control subject can be calculated. By controlling the brake actuator 11 on the basis of the calculated distance (D2−D1−S) to the "stop line" road marking 69, the brake pressure can be adjusted so that the vehicle 2 stops at the stop line.

By calculating the distance from a road marking detected by the rear camera 3 to a control subject located ahead indirectly as described above, without recognizing the control subject directly, the distance (D2−D1−S) to the control subject can be calculated accurately at an earlier stage. Then, on the basis of the accurately calculated distance (D2−D1−S) to the control subject, appropriate vehicle control and appropriately-timed traveling guidance can be performed.

Next, an exemplary driving support method, for example in the form of a program executed by the navigation ECU 6 of the driving support device 1 having the structure described above will be described on the basis of FIG. 10. The exemplary method may be implemented, for example, by one or more components of the above-described device. However, even though the exemplary structure of the above-described device may be referenced in the description, it should be appreciated that the structure is exemplary and the exemplary method need not be limited by any of the above-described exemplary structure.

Here, the driving support processing program is used to detect a road marking from an image captured by the rear camera 3 while the vehicle 2 travels on a road surface, to detect the distance between the vehicle and a control subject from the detected road marking, and to perform control to assist the driving of a user on the basis of this distance. Note that the program shown in the flowchart in FIG. 10 and described below is stored in the ROM or RAM provided in the navigation ECU 6 and executed by the CPU.

During the driving support processing, first, in step (abbreviated to S hereafter) 1, the navigation ECU 6 reads information regarding the road markings positioned around the vehicle 2 (in this example, 2000 m to the front of the vehicle 2 and 500 m to the rear of the vehicle 2) from the road marking DB 42 on the basis of the current location information of the vehicle 2, detected by the current location detection unit 9, and the road marking position information recorded in the road marking DB 42 (see FIG. 3).

Next, in S2, a determination is made as to whether or not a road marking positioned within a predetermined range of the vehicle 2 (30 m to the front of the vehicle 2 and 20 m to the rear of the vehicle 2) is present among the road markings read in S1. When it is determined that a road marking positioned within the predetermined range of the vehicle 2 is present (S2: YES), the method advances to S3, where the wear pattern of the road marking positioned within the predetermined range of the vehicle 2 is read from the road marking DB 42. On the other hand, when it is determined that a road marking positioned within the predetermined range of the vehicle 2 is not present (S2: NO), the method returns to S1, where the road marking information is read again on the basis of the current location.

Next, in S4, a determination is made as to whether or not the wear pattern read in S3 is a wear pattern subject to detection by the rear camera 3. Here, in the driving support device 1 according to this example, eight pattern types—pattern 1 through pattern 8—are provided as wear patterns (see FIG. 4 and FIG. 5). Road markings classified into wear patterns 1 through 7 are road markings that can at least be recognized by the navigation ECU 6 even when a portion of the paint thereof has worn away, and hence these road markings are determined to be road markings subject to detection by the rear camera 3.

On the other hand, road markings classified into wear pattern 8 are difficult to recognize since the outer form thereof cannot be detected correctly due to wear, and hence these road markings are determined to be road markings not subject to detection by the rear camera 3.

When it is determined that the wear pattern is subject to detection (the pattern 1 through the pattern 7 in this example) by the rear camera 3 (S4: YES), the method advances to S5, where road marking image recognition processing is performed. In contrast, when it is determined that the wear pattern is not subject to detection (the pattern 8 in this example) by the rear camera 3 (S4: NO), the method returns to S1 and the road marking information is read on the basis of the current location again.

Figure 11:
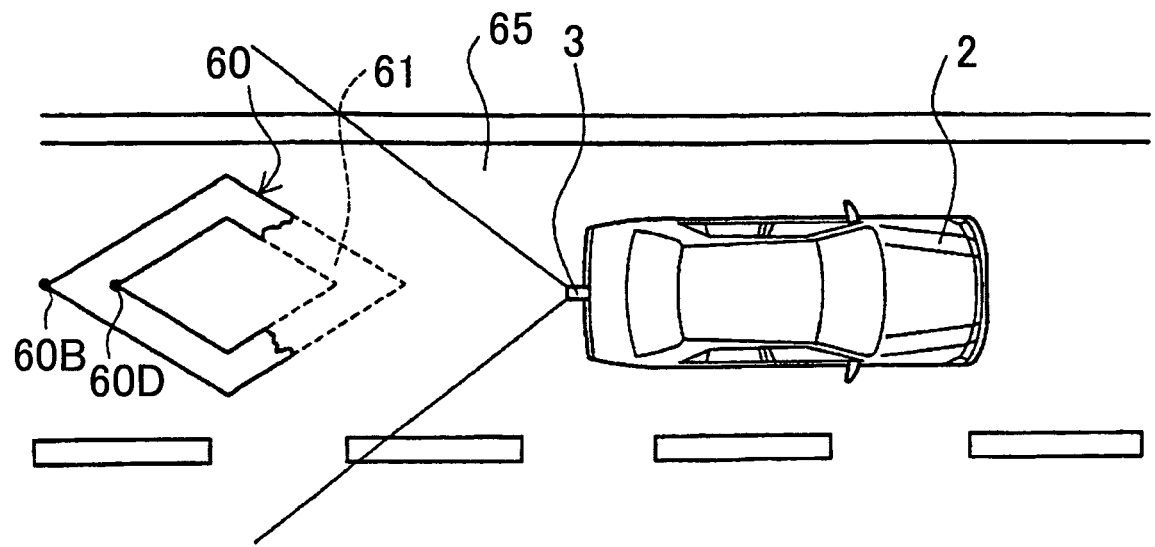
FIG. 11 is an overhead view showing a case in which a "pedestrian crossing ahead" road marking having a wear pattern which is classified specifically as pattern 4 is formed on the periphery of the vehicle.
Figure 12:
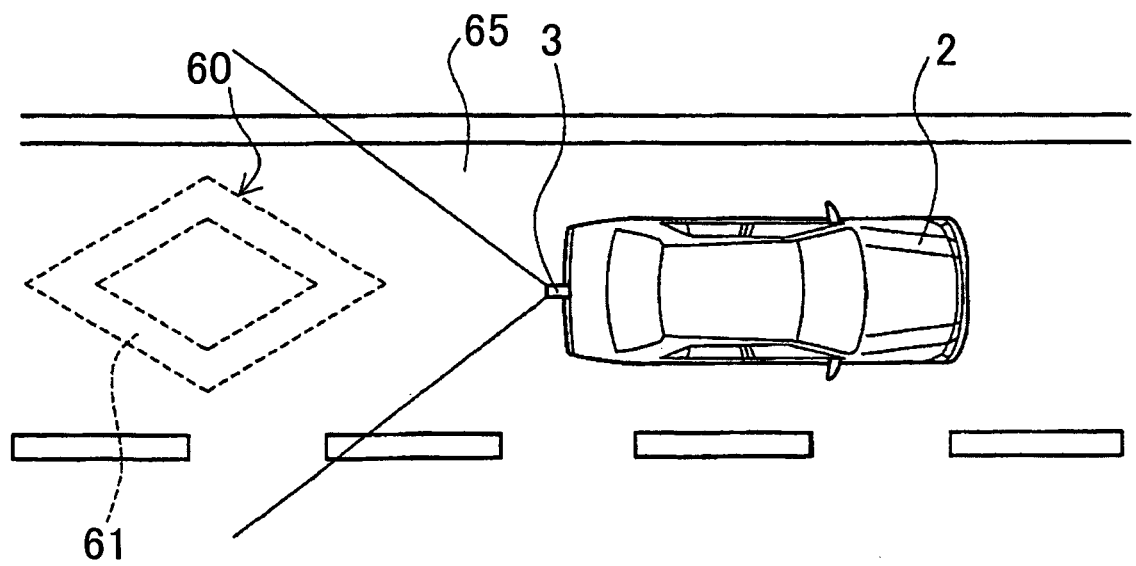
FIG. 12 is an overhead view showing a case in which a "pedestrian crossing ahead" road marking having a wear pattern which is classified specifically as pattern 8 is formed on the periphery of the vehicle.

Here, FIG. 11 is a pattern diagram showing a case in which the "pedestrian crossing ahead" road marking 60 having a wear pattern classified specifically as the pattern 4 is formed on the periphery of the vehicle 2. In this case, image recognition processing of the road marking 60 is performed from the image captured by the rear camera 3. FIG. 12 is a pattern diagram showing a case in which the "pedestrian crossing ahead" road marking 60 having a wear pattern classified specifically as the pattern 8 is formed on the periphery of the vehicle 2. In this case, image recognition processing of the road marking 60 from the image captured by the rear camera 3 is not performed.

In the road marking image recognition processing of S5, an image of the environment to the rear of the vehicle 2, which is captured by the rear camera 3, is downloaded and subjected to analysis processing to identify the boundary lines and measurement starting points of the road marking formed on the road surface along which the vehicle travels, and to determine the type of the detected road marking.

Specifically, first the image captured by the rear camera 3 is input using analog communication means such as NTSC or digital communication means such as i-link, and converted into a digital image format such as jpeg or mpeg. Next, using the fact that road markings are typically painted with white lines or yellow lines, the road surface on which the captured road marking is drawn and the surrounding road surface are subjected to luminance correction on the basis of the luminance difference therebetween. Next, binarization processing for separating the subject road marking from the image, geometric processing for correcting distortion, smoothing processing for removing noise from the image, and so on are performed to detect the boundary lines between the road marking and the surrounding road surface and the measurement starting points.

The type of the detected road marking is then identified from the arrangement of the detected boundary lines and identified measurement starting points, whereupon a determination is made as to whether or not the identified road marking type matches the type of the road marking determined to exist within the predetermined range of the vehicle in S2.

In S6, a determination is made as to whether or not the road marking has been recognized by the image recognition processing of S5, and if it is determined that the road marking has been recognized (S6: YES), or in other words if it is determined that a road marking has been detected in the captured image and the detected road marking matches the type of the road marking determined to be positioned around the vehicle in S2, the method advances to S7. If, on the other hand, it is determined that the toad marking has not been recognized (S6: NO), or in other words if it is determined that a road marking has not been detected in the captured image or that the detected road marking does not match the type of the road marking determined to be positioned around the vehicle in S2, the method returns to S1, where the road marking information is read again on the basis of the current location.

Next, in S7, detection processing is performed to detect the measurement starting points of the road marking captured by the rear camera 3 from the wear pattern of the road marking, read in S3, and the captured image subjected to image processing in S5.

For example, as shown in FIG. 6, when the "pedestrian crossing ahead" road marking 60 classified into the wear pattern 1 is recognized as the road marking positioned on the periphery of the vehicle 2, the measurement starting point 60A is selected initially as the starting point for distance measurement and detected on the basis of the lines of the road marking. If the measurement starting point 60A cannot be detected due to an obstruction such as sand or water, another measurement starting point is selected and detected in an order of precedence of 60B, 60C, 60D.

Further, as shown in FIG. 11, when the "pedestrian crossing ahead" road marking 60 classified into the wear pattern 4 is recognized as the road marking positioned on the periphery of the vehicle 2, the measurement starting point 60B is selected initially as the starting point for distance measurement and detected on the basis of the lines of the road marking. If the measurement starting point 60B cannot be detected due to an obstruction such as sand or water, the measurement starting point 60D is selected and detected.

In S8, the distance between the road marking detected in S3 and the vehicle 2 is calculated. Specifically, the distance D1 between the vehicle 2 and the measurement starting point is calculated from the position (specifically, the pixel count from the lower edge to the measurement starting point) of the measurement starting point detected in S7 within the captured image of the road marking (see FIG. 8). Note that S7 and S8 correspond to the processing of the distance calculation means.

Next, in S9, the distance (D2−D1) from the vehicle 2 to the control subject associated with the detected road marking is calculated from the distance D1 between the vehicle 2 and the measurement starting point, calculated in S8, and the distance D2 (the value of D2 is stored in advance in the road marking DB 42; see FIG. 3) to the control subjected associated with the detected road marking (see FIG. 9).

Next, in S10, the traveling distance S of the vehicle 2 from the road marking detection location is calculated by the distance sensor 35 on the basis of the vehicle speed pulse generated by the engine every time a fixed distance is traveled, and on the basis of the distance (D2−D1) from the vehicle 2 to the control subject, calculated in S6, the remaining distance (D2−D1−S) from the traveling vehicle 2 to the control subject is calculated (see FIG. 9).

In S11, a determination is made on the basis of the remaining distance (D2−D1−S) to the control subject, calculated in S10, as to whether or not the vehicle 2 has reached a guidance or control starting location, which is set for each type of control subject. For example, when the control subject is a "stop line" road marking, it is determined that the guidance or control starting location has been reached when the remaining distance is no greater than 50 m. Further, when the control subject is an "intersection" road marking, it is determined that the guidance or control starting location has been reached when the remaining distance reaches 10 m. Further, when the control subject is a "corner" road marking, it is determined that the guidance or control starting location has been reached when the remaining distance is no greater than 50 m.

When it is determined that the vehicle 2 has reached the guidance or control starting location (S11: YES), a determination is made on the basis of the current vehicle speed, the presence of a set target location, and so on as to whether or not travel guidance to the control subject or drive control of the vehicle 2 is required (S12). Here, in the driving support device 1 according to this example, when a "stop line" serves as the control subject and the distance to the stop line reaches 50 m, the character string "stop line approaching," which indicates that the stop line is drawing near, is displayed on the liquid crystal display 7 or an audio warning of the same content is output from the speaker 8. If deceleration is not performed at this point, deceleration control is performed by controlling the brake actuator 11 to stop the vehicle 2 in front of the stop line.

Further, when an "intersection" serves as the control subject and the distance to the node of the corresponding intersection reaches 10 m, route guidance is performed in accordance with the set designated route. For example, a guidance display indicating a left turn is displayed on the liquid crystal display 7, and audio guidance saying "turn left at the next intersection" is output from the speaker 8.

Further, when a "corner" serves as the control subject and the distance to the node of the corresponding corner reaches 50 m, acceleration and deceleration control are performed by controlling the brake actuator 11 and accelerator actuator 12 to achieve an optimum speed (for example, 40 km/h at R30) in relation to the R of the corner, which is recorded in the map DB 41, before entering the corner.

Hence, if the vehicle 2 is already traveling at the optimum speed when a "corner" serves as the control subject, for example, it is determined that control of the brake actuator 11 and accelerator actuator 12 is not required. Further, if a designated route has not been set (no target location has been set) when an "intersection" serves as the control subject, it is determined that travel guidance is not required.

When it is determined in S13 that travel guidance to the control subject or drive control of the vehicle 2 is required (S13: YES), travel guidance or drive control processing of the vehicle 2 is performed in accordance with the type of control subject in S14. The specific content of the guidance processing and drive control processing is as described above.

If, on the other hand, it is determined that the vehicle 2 has not reached the guidance or control starting location (S11: NO), and if it is determined that travel guidance to the control subject or drive control of the vehicle 2 is not required (S13: NO), the method returns to S10, where the current remaining distance (D2−D1−S) from the vehicle 2 to the control subject is recalculated.

Next, in S15, a determination is made as to whether or not the remaining distance (D2−D1−S) to the control subject, calculated in S10, has reached 0, or in other words whether or not the vehicle 2 has reached the position of the control subject. If it is determined that the position of the control subject has been reached (S15: YES), the driving support processing is terminated. If, on the other hand, it is determined that the position of the control subject has not been reached (S15: NO), the method returns to S10, where the current remaining distance (D2−D1−S) from the vehicle 2 to the control subject is recalculated.

As described in detail above, in the driving support device 1 according to this example, when it is determined that a road marking classified in a wear pattern that is subject to detection exists within a predetermined range of the vehicle 2 (S4: YES), the road marking is recognized from an image captured by the rear camera 3 (S5), and the distance from the vehicle 2 to a control subject associated with the recognized road marking is calculated (S7 to S10). When it is determined that the distance to the control subject has reached a predetermined distance (S11: YES), travel guidance or vehicle control corresponding to the type of the associated control subject is performed (S14).

Therefore, there is no need to detect a control subject such as a stop line or intersection directly, and the distance from the vehicle to the control subject can be calculated accurately in an indirect manner on the basis of the road marking detection result at an early stage when the distance to the control subject is great. Hence, there is no need for an expensive imaging device such as a front camera for capturing long-distance images, and control in relation to the control subject can be performed reliably. Furthermore, the precise position of the vehicle 2 can be identified, and therefore route guidance can be performed at a more accurate timing at locations on a designated route which require guidance, such as an intersection. When a control subject is detected directly as in the related art, guidance or control in relation to the control subject cannot be performed if the control subject cannot be recognized, but when the control subject is detected indirectly on the basis of a road marking, guidance or control can be performed in relation to the control subject even when a road marking cannot be detected by detecting another road marking with which the same control subject is associated.

Further, road markings classified into wear patterns that are difficult to detect can be eliminated as detection subjects in advance, thereby reducing the recognition error ratio during road marking recognition, and since only required processing is performed, the processing load of the navigation ECU 6 can be reduced. Hence, processing can be performed in tandem with the processing of the original navigation functions of the navigation device 4, and since an image processing control unit need not be provided separately, a reasonably-priced system can be realized.

Further, since an appropriate measurement starting point is selected on the basis of measurement starting points set for each classified wear pattern, and the distance from the vehicle 2 to the measurement starting point furthest advanced in the advancement direction (in the case of the "pedestrian crossing ahead" road marking 60 in FIG. 4 and FIG. 5, the measurement starting point 60A) is calculated, a part of the road marking having little wear can be used as the starting point for distance measurement, enabling an improvement in the distance measurement precision.

Figure 14:
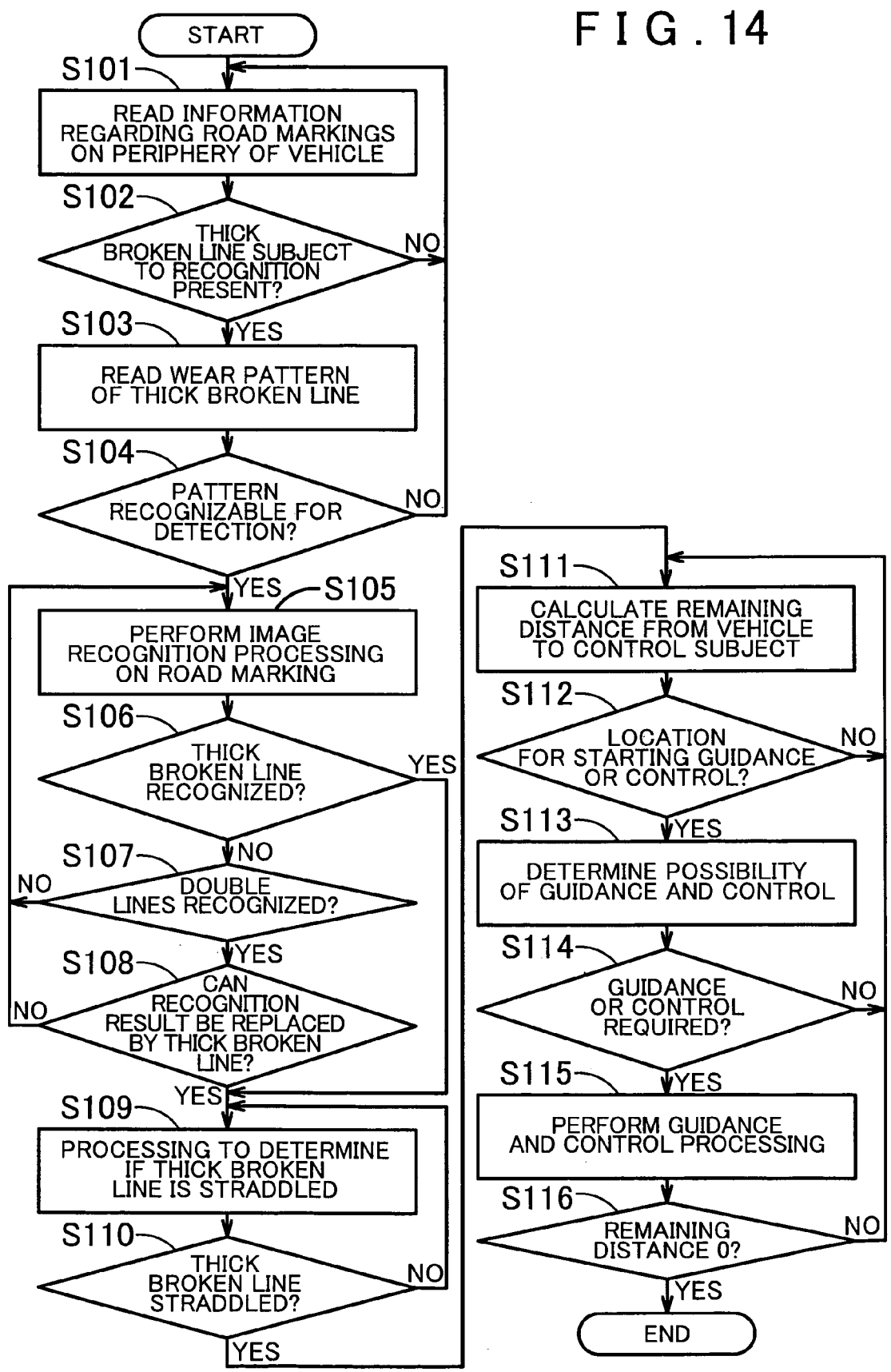
FIG. 14 is a flowchart of an exemplary driving support method.

Next, another example of a driving support device will be described on the basis of FIGS. 13 to 15. Note that in the following description, identical reference symbols to those used in the driving support device 1 of FIGS. 1-12 denote identical or corresponding parts to those of the driving support device 1.

The schematic structure of the driving support device according to this example is substantially identical to that of the driving support device 1. The various types of control processing are also substantially identical to those of the driving support device 1. In the driving support device according to this example, a traffic lane boundary line constituted by a thick broken line positioned on a connection portion (a turnoff point or an access point) between a main road and an access road of an expressway in particular is detected as a road marking, whereupon control is performed in relation to a control subject.

First, the road marking DB 42, in which information relating to road markings is stored in the data storage unit 10, will be described on the basis of FIG. 13. In the driving support device according to this example, this information is constituted by information relating to a road marking on a traffic lane boundary line constituted by a thick broken line positioned on a connection portion (a turnoff point or an access point) between a main road and an access road of an expressway. More specifically, a storage area of the road marking DB 42 is constituted by coordinates (a position) of the road marking on map data, a road marking type, a wear pattern indicating the wear condition of the paint constituting the road marking, a control subject associated with the road marking, and a distance from the road marking to the control subject (see FIG. 3).

The wear patterns of a road marking 80 on a traffic lane boundary line constituted by a thick broken line positioned on a connection portion (a turnoff point or an access point) between a main road and an access road of an expressway (to be referred to hereafter simply as a "thick broken line"), which is stored in the road marking DB 42 of the driving support device according to this example, will now be described using FIG. 13. FIG. 13 is an illustrative diagram showing, in particular, wear patterns of a "thick broken line" road marking 80, from among the wear patterns of the road markings used in the driving support device according to this example.

As shown in FIG. 13, in the driving support device according to this example, the wear patterns defined for the "thick broken line" road marking 80 are constituted by a total of five patterns, classified according to the position in which the paint is worn and the range of the wear.

For example, in a road marking classified as pattern 1, the paint has not suffered a large amount of wear, and therefore the rectangular frame of the marking is completely intact and paint is applied evenly throughout the interior of the marking. In a road marking classified as pattern 2, the rectangular frame is completely intact but the interior paint is uneven. In a road marking classified as pattern 3, a wear part 81 in which the paint is absent or thin exists, and a part of the rectangular frame is missing. In a road marking classified as pattern 4, the paint is absent or thin to the extent that the outline of the road marking cannot be recognized and the road marking does not resemble a thick broken line. In a road marking classified as pattern 5, a crack 82 is formed in the length direction of the paint of the broken line, thereby dividing the line into left and right parts such that the road marking resembles double lines.

As will be described below, when the "thick broken line" road marking 80 is detected from an image captured by the rear camera 3, the navigation ECU 6 determines whether or not the vehicle 2 is straddling the detected "thick broken line" road marking 80, and if so, the navigation ECU 6 is capable of extracting the distance to a control subject associated with the road marking 80 from the road marking DB 42, and specifying the current position of the vehicle accurately. Furthermore, on the basis of the accurately specified current position of the vehicle, various services such as driving support and information provision can be provided.

In the driving support device according to this example, when a forcible attempt is made to recognize a road marking classified as pattern 3, i.e. "a thick broken line in which a wear part 81 in which the paint is absent or thin exists, and a part of the rectangular frame is missing," a different type of road marking formed in a different location may be recognized erroneously as the corresponding "thick broken line" road marking 80. Hence, in relation to the "thick broken line" road marking 80 classified as pattern 3, control is performed to prevent the execution of detection processing. In so doing, road markings that are difficult to detect can be eliminated as detection subjects in advance, enabling a reduction in the recognition error ratio during road marking recognition. Furthermore, by performing only necessary processing, the processing load of the navigation ECU 6 can be reduced.

It is also difficult to recognize a road marking classified as pattern 4, i.e. "a thick broken line in which the paint is absent or thin to the extent that the outline of the road marking cannot be recognized and the road marking does not resemble a thick broken line" from an image captured by the rear camera 3. Hence, in relation to the "thick broken line" road marking 80 classified as pattern 4, control is performed to prevent the execution of detection processing. In so doing, road markings that are difficult to detect can be eliminated as detection subjects in advance, enabling a reduction in the recognition error ratio during road marking recognition. Furthermore, by performing only necessary processing, the processing load of the navigation ECU 6 can be reduced.

When recognition is performed on a road marking classified as pattern 5, i.e. "a thick broken line in which a crack 82 is formed in the length direction of the paint of the broken line such that the road marking resembles double lines" from an image captured by the rear camera 3, it is highly likely that the road marking will be recognized as a double line rather than a thick broken line. Hence, when the "thick broken line" road marking 80 classified as pattern 5 is recognized as double lines and no road marking containing double lines exists on the periphery of the vehicle, it is assumed that a thick broken line has been recognized, and the road marking is detected as the "thick broken line" road marking 80. In so doing, a road marking containing a line divided into double lines can be subjected to detection while achieving a reduction in the recognition error ratio.

Next, an exemplary driving support method, for example in the form of a processing program executed by the navigation ECU 6 of the driving support device according to the second embodiment, having the constitution described above, will be described on the basis of FIG. 14. The exemplary method may be implemented, for example, by one or more components of the above-described devices. However, even though the exemplary structure of the above-described devices may be referenced in the description, it should be appreciated that the structure is exemplary and the exemplary method need not be limited by any of the above-described exemplary structure.

The driving support processing program performs control to detect the "thick broken line" road marking from an image captured by the rear camera 3 as the vehicle 2 travels along a road surface, detect the distance from the detected road marking to the vehicle and a control subject, and assist the driver on the basis of this distance. Note that the program shown in the flowchart of FIG. 14 is stored in the ROM or RAM of the navigation ECU 6, and is executed by the CPU.

During driving support processing, first, in S100, the navigation ECU 6 reads information relating to road markings positioned on the periphery of the vehicle 2 (in the second embodiment, from 2000 m in front of the vehicle 2 to 500 m behind the vehicle 2) from the road marking DB 42 on the basis of information relating to the current location of the vehicle 2, detected by the current location detection unit 9, and the road marking position information recorded in the road marking DB 42 (see FIG. 3).

Next, in S102, a determination is made as to whether or not a "thick broken line" road marking 80 positioned within a predetermined range of the vehicle 2 (30 m in front of the vehicle 2 to 20 m behind the vehicle 2) is present among the road markings read in S1. When it is determined that a "thick broken line" road marking 80 positioned within the predetermined range of the vehicle 2 is present (S102: YES), the method advances to S103, where the wear pattern of the "thick broken line"; road marking 80 positioned within the predetermined range of the vehicle 2 is read from the road marking DB 42. On the other hand, when it is determined that a "thick broken line" road marking 80 positioned within the predetermined range of the vehicle 2 does not exist (S102: NO), the method returns to S101, and the road marking information is read again on the basis of the current location. Note that S103 corresponds to the processing of marking information extraction means.

Next, in S104, a determination is made as to whether or not the wear pattern read in S103 is subject to detection by the rear camera 3. In the driving support device according to this example, five pattern types—pattern 1 through pattern 5—are provided as the wear patterns of the "thick broken line" road marking 80 (see FIG. 13). Road markings classified into wear patterns 1 and 2 are road markings that can at least be recognized by the navigation ECU 6 even when a portion of the paint thereof has worn away, and hence these road markings are determined to be road markings subject to detection by the rear camera 3.

On the other hand, road markings classified into wear patterns 3 and 4 are difficult to recognize since the outer form thereof cannot be detected correctly due to wear, and hence these road markings are determined to be road markings not subject to detection by the rear camera 3.

Further, a road marking classified into wear pattern 5 is highly likely to be recognized as double lines due to wear, and therefore, as will be described below, when such a road marking is recognized as double lines and satisfies a fixed condition, it is assumed that the road marking is a thick broken line, and the road marking is determined to be a road marking on which detection processing may be performed. Note that S104 corresponds to the processing of marking condition determination means.

When it is determined that the wear pattern is subject to detection (the patterns 1, 2 and 5 in the second embodiment) by the rear camera 3 (S104: YES), the method advances to S105, where road marking image recognition processing is performed. In contrast, when it is determined that the wear pattern is not subject to detection (the patterns 3 and 4 in the second embodiment) by the rear camera 3 (S104: NO), the method returns to S101 and the road marking information is read on the basis of the current location again.

Figure 15:
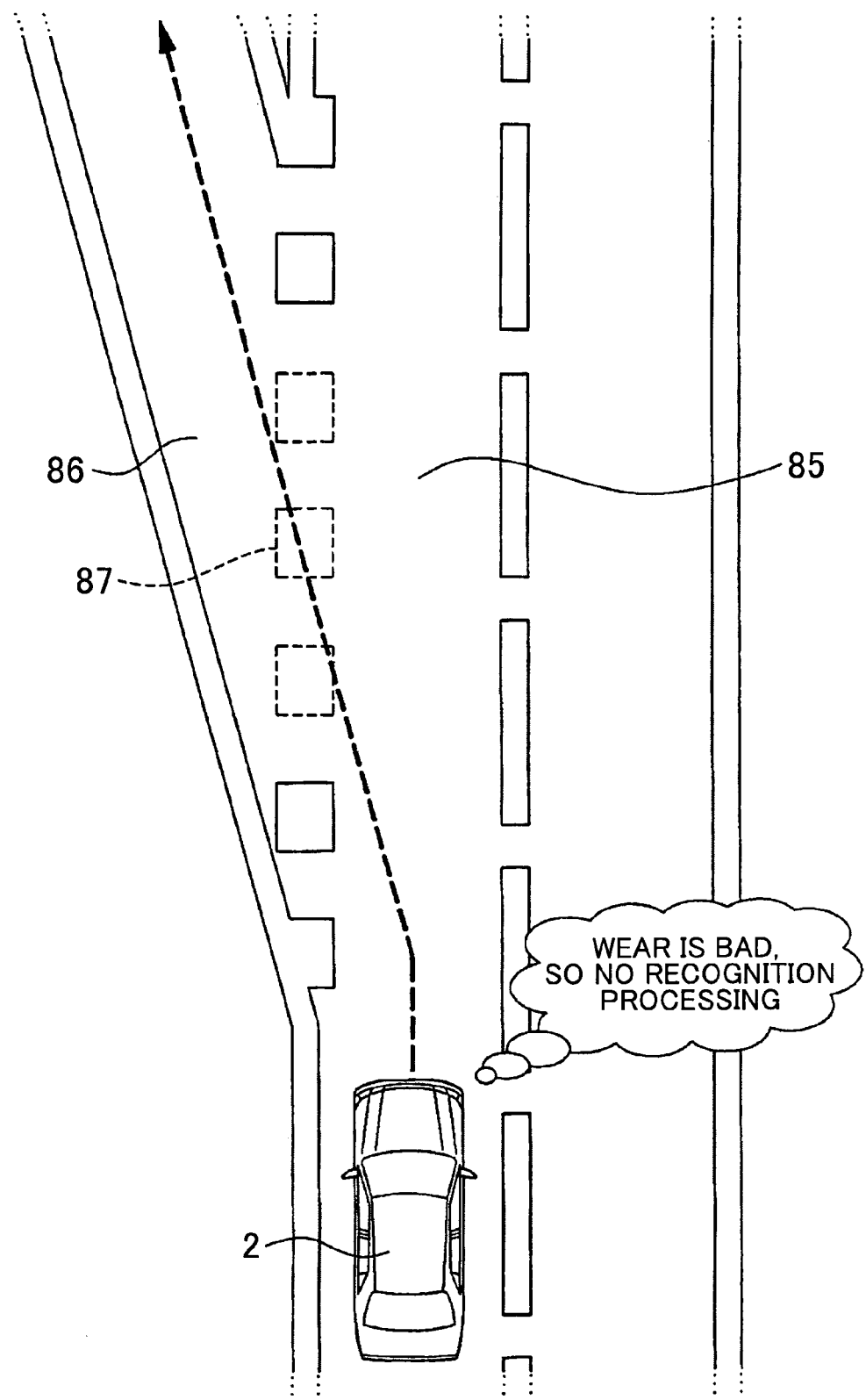
FIG. 15 is an overhead view showing a case in which a "thick broken line" road marking having a wear pattern classified as a pattern 4 is formed in front of the vehicle.

Here, FIG. 15 is an overhead view showing a case in which the "thick broken line" road marking having a wear pattern classified specifically as the pattern 4 is formed in front of the vehicle 2. As shown in FIG. 15, when the vehicle 2 is traveling along a main road 85 of an expressway, and an access road 86 bifurcates from the main road 85 in the advancement direction of the vehicle 2, information relating to a "thick broken line" road marking 87 formed at the connection point between the main road 85 and the access road 86 is read from the road marking DB 42 (S101).

When the read "thick broken line" road marking 87 is a "thick broken line" road marking classified into the wear pattern 4, i.e. some of the paint of the road marking is missing, as shown in FIG. 15, image recognition processing (S105) is not subsequently performed on the road marking 87 on the basis of the image captured by the rear camera 3.

Next, in the road marking image recognition processing of S105, an image of the environment to the rear of the vehicle 2, which is captured by the rear camera 3, is downloaded and subjected to analysis processing to identify the boundary lines of the road marking formed on the road surface along which the vehicle is traveling, and to determine the type of the detected road marking.

Specifically, first the image captured by the rear camera 3 is input using analog communication means such as NTSC or digital communication means such as i-link, and converted into a digital image format such as jpeg or mpeg. Next, using the fact that road markings are typically painted in white lines or yellow lines, luminance correction is performed on the basis of a luminance difference between the road surface on which the captured road marking is drawn and the surrounding road surface. Next, binarization processing for separating the subject road marking from the image, geometric processing for correcting distortion, smoothing processing for removing noise from the image, and so on are performed to detect the boundary lines between the road marking and the surrounding road surface. The type of the detected road marking is then determined from the shape of the detected boundary lines.

In S106, a determination is made as to whether or not the "thick broken line" road marking 80 has been recognized in the image recognition processing of S105. If it is determined that the "thick broken line" road marking 80 has been recognized (S106: YES), or in other words if it is determined that a road marking has been detected in the captured image and that the detected road marking is determined to be the "thick broken line" road marking 80 which was determined to be positioned around the vehicle in S102, the method advances to S109. If, on the other hand, it is determined that the "thick broken line" road marking 80 has not been recognized (S106: NO), or in other words if it is determined that a road marking has not been detected in the captured image or that the detected road marking is not determined to be the "thick broken line" road marking 80 which was determined to be positioned around the vehicle in S102, the method returns to S107.

Next, in S107, a determination is made as to whether or not double lines that are parallel to each other via a predetermined gap have been recognized in the image recognition processing of S105. If, as a result, it is determined that double lines have been recognized (S107: YES), or in other words if it is determined that a road marking has been detected in the captured image and the detected road marking is determined to be double lines that are parallel to each other via a predetermined gap, the method advances to S108. On the other hand, if it is determined that double lines have not been recognized (S107: NO), the method returns to S105, where image recognition processing is performed again on the basis of the image captured by the rear camera 3.

In S108, the navigation ECU 6 determines whether or not the recognized double lines can be replaced by the "thick broken line" road marking 80. Specifically, first a determination is made as to whether or not another road marking containing double lines exists within a predetermined range (for example, from 30 m in front of the vehicle 2 to 20 m behind the vehicle 2) from the current position of the vehicle 2. When it is determined that another road marking containing double lines does not exist, it is determined that the recognized double lines can be replaced by the "thick broken line" road marking 80. As a result, the recognized double lines are detected as a part or all of the "thick broken line" road marking 80.

Figure 16:
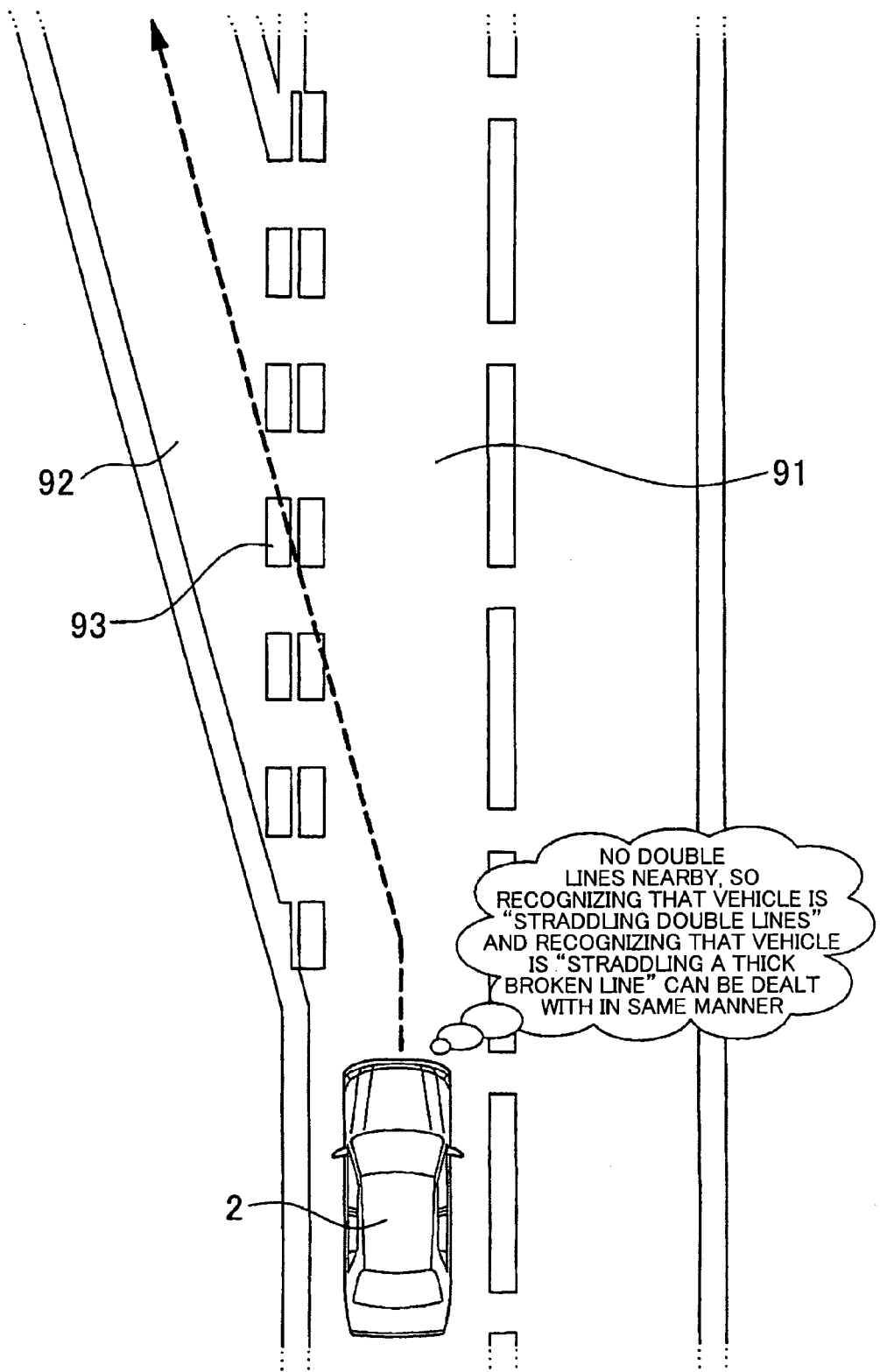
FIG. 16 is an overhead view showing a case in which a "thick broken line" road marking having a wear pattern classified as a pattern 5 is formed on the periphery of the vehicle.

FIG. 16 is an overhead view illustrating a case in which a "thick broken line" road marking classified as wear pattern 5 is formed in front of the vehicle 2. As shown in FIG. 16, when the vehicle 2 is traveling along a main road 91 of an expressway and an access road 92 bifurcating from the main road 91 exists in the advancement direction of the vehicle 2, information relating to a "thick broken line" road marking 93 formed at the connection portion between the main road 91 and the access road 92 is read from the road marking DB 42 (S101).

When the read "thick broken line" road marking 93 is a "thick broken line" road marking classified as pattern 5, i.e., in which the paint is divided in the length direction, as shown in FIG. 16, and no other road marking containing double lines exists within a predetermined range (for example, from 30 m in front of the vehicle 2 to 20 m behind the vehicle 2) of the vehicle 2, processing is performed on the road marking assuming that the road marking is the "thick broken line" road marking 93, even when the road marking is recognized as double lines in the image recognition processing performed on the road marking 93 on the basis of the image captured by the rear camera 3. As a result, the "thick broken line" road marking 93 can be detected accurately even when divided into double lines. Note that S101 to S108 described above correspond to the processing of road marking detection means.

Next, in S109, the navigation ECU 6 performs determination processing to detect whether or not the vehicle 2 is straddling the "thick broken line" road marking 80 detected in S101 to S108. Note that the image captured by the rear camera 3, a vehicle speed sensor, and so on are used in this determination processing.

In S110, a determination is made on the basis of the determination processing performed in S109 as to whether or not the vehicle 2 is straddling the "thick broken line" road marking 80, and when it is determined that the vehicle 2 is not straddling the "thick broken line" road marking 80 (S110: YES), the method returns to S109, where the determination processing is continued.

On the other hand, when it is determined that the vehicle 2 is straddling the "thick broken line" road marking 80 (S110: YES), the method advances to S111.

In S111, the navigation ECU 6 calculates the distance from the vehicle 2 to a control subject associated with the "thick broken line" road marking 80 detected by the rear camera 3 and determined to be straddled by the vehicle 2 on the basis of the distance (stored in the road marking DB 42) to the control subject associated with the detected road marking. Then, on the basis of a vehicle speed pulse generated at fixed traveling distance intervals, the traveling distance of the vehicle 2 from the location straddling the road marking is calculated by a distance sensor 35, and a remaining distance from the traveling vehicle 2 to the control subject is calculated.

In S112, a determination is made as to whether or not the vehicle 2 has reached a guidance or control starting location set in relation to each type of control subject on the basis of the remaining distance to the control subject calculated in S111. For example, when the control subject is a "stop line" road marking, it is determined that the guidance or control starting location has been reached when the remaining distance is no greater than 50 m. Further, when the control subject is an "intersection" road marking, it is determined that the guidance or control starting location has been reached when the remaining distance reaches 10 m. Further, when the control subject is a "corner" road marking, it is determined that the guidance or control starting location has been reached when the remaining distance is no greater than 50 m.

When it is determined that the vehicle 2 has reached the guidance or control starting location (S112: YES), a determination is made on the basis of the current vehicle speed, the presence of a set target location, and so on as to whether or not travel guidance to the control subject or drive control of the vehicle 2 is required (S113). Here, in the driving support device according to the second embodiment, when a "stop line" serves as the control subject and the distance to the stop line reaches 50 m, the character string "stop line approaching," which indicates that the stop line is drawing near, is displayed on the liquid crystal display 7 or an audio warning of the same content is output from the speaker 8. If deceleration is not performed at this point, deceleration control is performed by controlling the brake actuator 11 to stop the vehicle 2 in front of the stop line.

When an "intersection" serves as the control subject and the distance to the node of the corresponding intersection reaches 10 m, route guidance is performed in accordance with the set designated route. For example, a guidance display indicating a left turn is displayed on the liquid crystal display 7, and audio guidance saying "turn left at the next intersection" is output from the speaker 8.

When a "corner" serves as the control subject and the distance to a node at the starting point of the corresponding corner reaches 50 m, acceleration and deceleration control are performed by controlling the brake actuator 111 and accelerator actuator 12 to achieve an optimum speed (for example, 40 km/h at R30) in relation to the R of the corner, which is recorded in the map DB 41, before entering the corner.

Hence, if the vehicle 2 is already traveling at the optimum speed when a "corner" serves as the control subject, for example, it is determined that control of the brake actuator 11 and accelerator actuator 12 is not required. Further, if a designated route has not been set (no target location has been set) when an "intersection" serves as the control subject, it is determined that travel guidance is not required.

When it is determined in S113 that travel guidance to the control subject or drive control of the vehicle 2 is required (S114: YES), travel guidance or drive control processing of the vehicle 2 is performed in accordance with the type of control subject in S115. The specific content of the guidance processing and drive control processing is as described above.

If, on the other hand, it is determined that the vehicle 2 has not reached the guidance or control starting location (S112: NO), or if it is determined that travel guidance to the control subject or drive control of the vehicle 2 is not required (S114: NO), the method returns to S111, where the current remaining distance from the vehicle 2 to the control subject is recalculated.

Next, in S116, a determination is made as to whether or not the remaining distance to the control subject, calculated in S111, has reached 0, or in other words whether or not the vehicle 2 has reached the position of the control subject. If it is determined that the position of the control subject has been reached (S116: YES), the driving support processing is terminated. If, on the other hand, it is determined that the position of the control subject has not been reached (S116: NO), the method returns to S111, where the current remaining distance from the vehicle 2 to the control subject is recalculated.

As described in detail above, in the driving support device according to the second embodiment, when it is determined that a traffic lane boundary line road marking constituted by a thick broken line positioned on a connection portion (a turn-off point or an access point) between a main road and an access road of an expressway exists within a predetermined range of the vehicle 2 (S102: YES), and when it is determined that the "thick broken line" road marking is classified into a wear pattern that can be detected (S104: YES), the road marking is recognized from an image captured by the rear camera 3 (S105). Then, when the vehicle 2 is straddling the recognized "thick broken line" road marking, the distance to a control subject associated with the road marking is calculated (S111), and when it is determined that the distance to the control subject has reached a predetermined distance (S112: YES), travel guidance or vehicle control corresponding to the type of the associated control subject is performed (S115).

Therefore, there is no need to detect a control subject such as a stop line or intersection directly, and the distance from the vehicle to the control subject can be calculated accurately in an indirect manner on the basis of the road marking detection result at an early stage when the vehicle is removed from the control subject. Hence, there is no need for an expensive imaging device such as a front camera for capturing long-distance images, and control in relation to the control subject can be performed reliably. Furthermore, the precise position of the vehicle 2 can be identified, and therefore route guidance can be performed at a more accurate timing in locations on a designated route which require guidance, such as an intersection. When a control subject is detected directly as in the related art, guidance or control in relation to the control subject cannot be performed if the control subject cannot be recognized, but when the control subject is detected indirectly on the basis of a road marking, guidance or control can be performed in relation to the control subject even when a road marking cannot be detected, by detecting another road marking with which the same control subject is associated.

Further, road markings classified into wear patterns that are difficult to detect can be eliminated as detection subjects in advance, thereby reducing the recognition error ratio during road marking recognition, and since only required processing is performed, the processing load of the navigation ECU 6 can be reduced. Hence, processing can be performed in tandem with the processing of the original navigation functions of the navigation device 4, and since an image processing control unit need not be provided separately, a reasonably-priced system can be realized.

Further, when a "thick broken line" road marking 80 classified as pattern 5, in which a crack 82 is formed in the length direction of the paint of the broken line such that the road marking resembles double lines, is determined to exist (S102: YES) and double lines are recognized in the subsequent image recognition processing (S105), as long as another road marking containing a double line does not exist on the periphery of the vehicle, the double line is replaced by the "thick broken line," and it is assumed that the "thick broken line" road marking 80 has been detected. In so doing, even a road marking that has been divided into double lines due to peeling of the paint and so on can be detected as the correct type of road marking. As a result, road markings on traffic lane boundary lines, which are likely to be divided into double lines due to peeling of the paint, can be detected more often, and therefore various services employing the detection result, such as driving assistance, information provision, and so on, can be provided.

Figure 17:
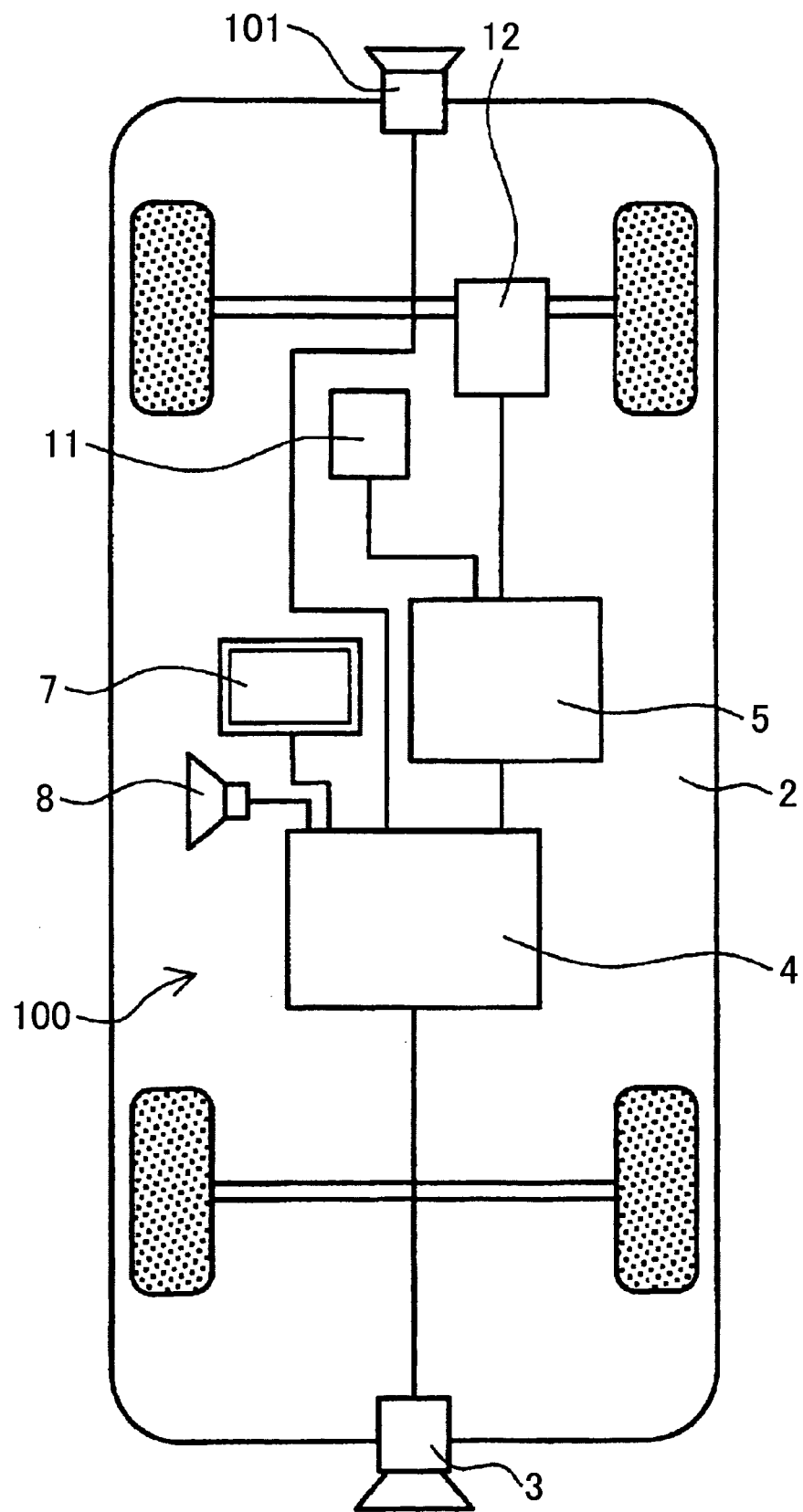
FIG. 17 is a schematic diagram of an exemplary driving support device.

Next, an exemplary driving support device 100 according to another example will be described on the basis of FIG. 17. Note that in the following description, identical reference symbols to those used in the driving support device 1 of FIGS. 1-12 denote identical or corresponding parts to those of the driving support device 1.

The schematic structure of the driving support device 100 according to this example is substantially identical to that of the driving support device 1. The various types of control processing are also substantially identical to those of the driving support device 1. However, the driving support device 100 according to this example differs from the driving support device 1 in that the driving support device 1 is provided with the rear camera 3 for capturing images of the rear environment as an imaging device, road marking recognition is performed on the basis of an image captured by the rear camera, and then control is performed in relation to a control subject, whereas the driving support device 100 according to this example is provided with a front camera 101 for capturing images of the front environment of the vehicle 2 in addition to the rear camera 3 as an imaging device, road marking recognition is performed on the basis of images captured by the front camera 101 as well as the rear camera 3, and then control is performed in relation to a control subject.

First, an outline of the structure of the driving support device 100 according to this example will be described using FIG. 17. FIG. 17 is a schematic diagram of the driving support device 100 according to the third embodiment. As shown in FIG. 17, the driving support device 1 according to this example includes the front camera 101, rear camera 3, navigation device 4, vehicle ECU 5, and so on, which are disposed on the vehicle 2.

The front camera 101 employs a solid state imaging element such as a CCD, for example, and is attached near the upper center of a number plate attached to the front of the vehicle 2 such that a sight line direction faces slightly downward from the horizon. Thus, the front camera 101 captures images of traffic lights, road signs, road markings, and so on disposed in front of the vehicle 2.

The rear camera 3, navigation device 4, vehicle ECU 5, and all structures other than the front camera 101 are similar to those of the driving support device 1 according to the first embodiment, and hence description thereof has been omitted.

In the driving support device 100 according to the third embodiment, enlargement of the control subject and an improvement in the road marking recognition ratio can be realized in the following manner on the basis of images captured by the front camera 101.

For example, when it is determined on the basis of an image captured by the front camera 101 that traffic lights positioned at an intersection ahead are red, travel guidance and vehicle drive control (S111 to S14, S112 to S115) corresponding to the "intersection" control subject are performed as described above, and in addition, a warning that the traffic lights at the intersection are red can be issued, and the brake actuator 11 can be controlled to stop the vehicle 2 in front of the intersection.

Further, when it is determined on the basis of the image captured by the front camera 101 that a road sign indicating a temporary stoppage is disposed at an intersection ahead, travel guidance and vehicle drive control (S11 to S14, S112 to S115) corresponding to the "intersection" control subject are performed as described above, and in addition, a warning relating to the temporary stoppage can be issued, and the brake actuator 11 can be controlled to stop the vehicle 2 in front of the intersection.

Further, when it is determined on the basis of the image captured by the front camera 101 that a road marking is formed on the road surface ahead, the timing at which the vehicle 2 passes the road marking is calculated and image recognition processing by the rear camera 3 is performed in alignment with the calculation timing. As a result, the road marking recognition ratio can be improved even when the rear camera 3 has a narrow field of view.

As described in detail above, in the driving support device 100 according to this example, when it is determined that a road marking classified as a wear pattern that is subject to detection exists within a predetermined range of the vehicle 2, the road marking is recognized from an image captured by the rear camera 3, and the distance from the vehicle 2 to a control subject associated with the recognized road marking is calculated. When it is determined that the distance to the control subject has reached a predetermined distance, travel guidance or vehicle control corresponding to the type of the associated control subject is performed. Therefore, there is no need to detect a control subject such as a stop line or intersection directly, and the distance from the vehicle to the control subject can be calculated accurately in an indirect manner on the basis of the road marking detection result at an early stage when the vehicle is removed from the control subject.

Further, more precise travel guidance and vehicle drive control can be performed in accordance with the current peripheral conditions of the vehicle 2 on the basis of image analysis performed on an image of the front environment of the vehicle 2 captured by the front camera 101. Moreover, by having the front camera 101 recognize the road marking in advance, the road marking recognition ratio can be improved even when the rear camera 3 has a narrow field of view.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the first through third embodiments, the control subject is described as a stop line, an intersection, and the entrance to a corner, but the control subject is not limited to these examples, and may be a road marking such as a pedestrian crossing or a facility such as an interchange, for example.

What is claimed is:

1. A road marking recognition system for a vehicle, comprising:
    a camera disposed on the vehicle that captures an image of a periphery of the vehicle;
    a memory that stores:
        locations of different types of road markings formed on road surfaces; and
        a plurality of wear patterns associated with each type of road marking, each wear pattern indicating a wear condition of the associated road marking and each stored wear pattern comprising measurement starting points in a plurality of locations; and
    a controller that:
        detects a road marking on the basis of the image captured by the camera;
        compares the detected road marking to the stored wear patterns;
        if the detected road marking matches one of the stored wear patterns; determines that the detected road marking is the stored type of road marking that is associated with the matching stored wear pattern;
        selects one of the measurement starting points from the plurality of measurement starting points on the basis of the matching stored wear pattern;
        calculates a distance between the vehicle and the detected road marking based on the selected measurement starting point; and
        executes a predetermined action associated with the stored type of road marking that is associated with the matching stored wear pattern and the calculated distance.

2. The road marking recognition system according to claim 1, further comprising:
    a current position detector that detects a current location of the vehicle;
    wherein the controller:
        extracts the plurality of wear patterns associated with a type of road marking located within a predetermined range of the detected current location from the memory;
        compares the extracted plurality of wear patterns to the detected road marking; and
        if one of the extracted wear patterns matches the detected road marking, executes the predetermined action associated with the stored type of road marking that is associated with the matching stored wear pattern.

3. The road marking recognition system according to claim 1, wherein the stored wear patterns comprise approaching pedestrian crossing wear patterns that are associated with a type of road marking indicating an approaching pedestrian crossing, each of the approaching pedestrian crossing wear patterns indicating various types of deterioration of the type of road marking indicating the approaching pedestrian crossing.

4. The road marking recognition system according to claim 1, wherein the stored wear patterns comprise main-access road boundary wear patterns that are associated with a type of road marking representing a traffic lane boundary line positioned at a connection portion between a main road and an access road of an expressway, each of the main-access road boundary wear patterns representing various types of deterioration of the type of road marking representing the traffic lane boundary line positioned at the connection portion between the main road and the access road of the expressway.

5. The road marking recognition system according to claim 4, wherein the stored wear patterns comprise traffic lane boundary line wear patterns that are associated with a type of road marking representing a traffic lane boundary line, each of the traffic lane boundary line wear patterns representing the type of road marking representing the traffic lane boundary line which has been divided in a length direction due to various types of deterioration.

6. The road marking recognition system according to claim 5, further comprising:

a current position detector that detects a current location of the vehicle;

wherein the controller:

extracts the plurality of wear patterns associated with a type of road marking located within a predetermined range of the detected current location from the memory;

recognizes a shape of the road marking formed on the road surface on the basis of the captured image; and when the recognized shape includes double lines that are parallel to each other via a predetermined gap and when the extracted plurality of wear patterns do not include information of a road marking containing double lines, detects the recognized shape as the type of road marking representing the traffic lane boundary line.

7. The road marking recognition system according to claim 1, wherein the camera is a rear camera located on a rear of the vehicle that captures an image of a rear periphery of the vehicle.

8. The road marking recognition system according to claim 7, further comprising a second camera located on a front of the vehicle that captures an image of a front periphery of the vehicle.

9. The road marking recognition system according to claim 8, wherein the controller:

detects the road marking based on the image of the front periphery of the vehicle;

calculates a distance from the vehicle to the detected road marking; and determines a timing for capturing an image of the road marking with the rear camera based on the calculated distance.

10. A road marking recognition method for use with a vehicle, comprising:

capturing an image of a periphery of the vehicle with a camera;

accessing a memory containing:

locations of different types of road markings formed on road surfaces; and a plurality of wear patterns associated with each type of road marking, each wear pattern indicating a wear condition of the associated road marking and each stored wear pattern comprising measurement starting points in a plurality of locations;

detecting a road marking on the basis of the image captured by the camera;

comparing the detected road marking to the stored wear patterns;

if the detected road marking matches one of the stored wear patterns, determining that the detected road marking is the stored type of road marking that is associated with the matching stored wear pattern;

selecting one of the measurement starting points from the plurality of measurement starting points on the basis of the matching stored wear pattern; and calculating a distance between the vehicle and the detected road marking based on the selected measurement starting point; and executing a predetermined action associated with the stored type of road marking that is associated with the matching stored wear pattern and the calculated distance.

11. The road marking recognition method according to claim 10, further comprising:

detecting a current location of the vehicle;

extracting the plurality of wear patterns associated with a type of road marking located within a predetermined range of the detected current location from the memory;

comparing the extracted plurality of wear patterns to the detected road marking; and if one of the extracted wear patterns matches the detected road marking, executing the predetermined action associated with the stored type of road marking that is associated with the matching stored wear pattern.

12. The road marking recognition method according to claim 10, wherein the stored wear patterns comprise approaching pedestrian crossing wear patterns that are associated with a type of road marking indicating an approaching pedestrian crossing, each of the approaching pedestrian crossing wear patterns indicating various types of deterioration of the type of road marking indicating the approaching pedestrian crossing.

13. The road marking recognition method according to claim 10, wherein the stored wear patterns comprise main-access road boundary wear patterns that are associated with a type of road marking representing a traffic lane boundary line positioned at a connection portion between a main road and an access road of an expressway, each of the main-access road boundary wear patterns representing various types of deterioration of the type of road marking representing the traffic lane boundary line positioned at the connection portion between the main road and the access road of the expressway.

14. The road marking recognition method according to claim 13, wherein the stored wear patterns comprise traffic lane boundary line wear patterns that are associated with a type of road marking representing a traffic lane boundary line, each of the traffic lane boundary line wear patterns representing the type of road marking representing the traffic lane boundary line which has been divided in a length direction due to various types of deterioration.

15. The road marking recognition method according to claim 13, further comprising:

detecting a current location of the vehicle;

extracting the plurality of wear patterns associated with a type of road marking located within a predetermined range of the detected current location from the memory;

recognizing a shape of the road marking formed on the road surface on the basis of the captured image; and when the recognized shape includes double lines that are parallel to each other via a predetermined gap and when the extracted information does not include information of a road marking containing double lines, detecting the recognized shape as the type of road marking representing the traffic lane boundary line.

16. The road marking recognition method according to claim 10, wherein the captured image an image of a rear periphery of the vehicle captured by a camera located on a rear of the vehicle.

17. The road marking recognition method according to claim 16, further comprising capturing an image of a front periphery of the vehicle with a second camera located on a front of the vehicle.

18. The road marking recognition method according to claim 17, further comprising:

detecting the road marking based on the image of the front periphery of the vehicle;

calculating a distance from the vehicle to the detected road marking; and determining a timing for capturing an image of the road marking with the rear camera based on the calculated distance.

19. A non-transitory computer-readable storage medium storing a computer-executable program usable to recognize road markings, the program comprising:
- instructions for capturing an image of a periphery of a vehicle;
- instructions for accessing a memory containing:
  - locations of different types of road markings formed on road surfaces; and
  - a plurality of wear patterns associated with each type of road marking, each wear pattern indicating a wear condition of the associated road marking and each stored wear pattern comprising measurement starting points in a plurality of locations;
- instructions for detecting a road marking on the basis of the image captured by the camera;
- instructions for comparing the detected road marking to the stored wear patterns;
- instructions for, if the detected road marking matches one of the stored wear patterns, determines that the detected road marking is the stored type of road marking that is associated with the matching stored wear pattern;
- instructions for selecting one of the measurement starting points from the plurality of measurement starting points on the basis of the matching stored wear pattern; and
- instructions for calculating a distance between the vehicle and the detected road marking based on the selected measurement starting point; and
- instructions for, executing a predetermined action associated with the stored type of road marking that is associated with the matching stored wear pattern and the calculated distance.

* * * * *